(12) United States Patent
Robinson et al.

(10) Patent No.: US 12,036,649 B2
(45) Date of Patent: Jul. 16, 2024

(54) PNUEMATIC FASTENING TOOL WITH WIRELESS SENSOR PACKAGE

(71) Applicant: Kyocera Senco Industrial Tools, Inc., Cincinnati, OH (US)

(72) Inventors: Derick C. Robinson, Hillsboro, OH (US); Christopher D. Klein, Cincinnati, OH (US)

(73) Assignee: Kyocera Senco Industrial Tools, Inc., Cincinnati, OH (US)

(*) Notice: Subject to any disclaimer, the term of this patent is extended or adjusted under 35 U.S.C. 154(b) by 0 days.

(21) Appl. No.: 17/494,163

(22) Filed: Oct. 5, 2021

(65) Prior Publication Data
US 2022/0105614 A1 Apr. 7, 2022

Related U.S. Application Data

(60) Provisional application No. 63/088,164, filed on Oct. 6, 2020.

(51) Int. Cl.
B25C 1/04 (2006.01)
B25C 1/06 (2006.01)
H04L 67/12 (2022.01)

(52) U.S. Cl.
CPC ............ *B25C 1/047* (2013.01); *B25C 1/06* (2013.01); *H04L 67/12* (2013.01)

(58) Field of Classification Search
CPC .. B25C 1/047; B25C 1/04; B25C 1/06; H04L 67/12
See application file for complete search history.

(56) References Cited

U.S. PATENT DOCUMENTS

| RE41,160 E | * | 3/2010 | Gilmore | G05B 19/406 70/57.1 |
|---|---|---|---|---|
| 8,174,274 B2 | | 5/2012 | Lawrence | |
| 2009/0251330 A1 | | 10/2009 | Gerold | |
| 2011/0148437 A1 | * | 6/2011 | Lawrence | B25C 1/047 340/686.1 |
| 2016/0303722 A1 | | 10/2016 | Moore et al. | |
| 2017/0220825 A1 | * | 8/2017 | Wang | G01F 1/684 |

(Continued)

FOREIGN PATENT DOCUMENTS

| CN | 205648261 U | * | 10/2016 | ............ H05K 5/02 |
| JP | H-06312381 A | * | 4/1993 | ............ B25B 21/00 |
| WO | 2020031887 | | 2/2020 | |

OTHER PUBLICATIONS

International Search Report, PCT/US21/53522, 9 pages (Jan. 24, 2022).

*Primary Examiner* — Veronica Martin
(74) *Attorney, Agent, or Firm* — Frederick H. Gribbell; Russell F. Gribbell

(57) ABSTRACT

A pneumatic fastener driving tool is provided with a sensor package. A first portion of the sensor package is mounted in the handle of the tool, with a data cable running to a second portion of the sensor package mounted to an external cylinder wall of the working cylinder. A second portion includes at least one sensor to monitor piston operating cycles and other tool statistics. An antenna exiting the first portion of the sensor package and is threaded through the tool's outer housing to provide a clear radio signal to an external computer. The antenna allows wireless access to download information gathered by the sensors, or to upload new software instructions.

21 Claims, 15 Drawing Sheets

(56) References Cited

U.S. PATENT DOCUMENTS

| | | | |
|---|---|---|---|
| 2018/0178361 A1 | 6/2018 | Kabbes et al. | |
| 2019/0097668 A1* | 3/2019 | Nicolaidis | H04W 4/029 |
| 2019/0200201 A1 | 6/2019 | Schadow | |
| 2019/0222957 A1 | 7/2019 | Burch | |
| 2019/0229905 A1 | 7/2019 | Fan | |
| 2020/0070330 A1* | 3/2020 | Carrier | H02K 11/30 |
| 2021/0094160 A1* | 4/2021 | Green | B25C 1/043 |
| 2021/0360775 A1* | 11/2021 | Smith | B25F 5/006 |
| 2022/0143797 A1* | 5/2022 | Ishizawa | B25C 1/047 |
| 2022/0355451 A1* | 11/2022 | Mecklenburg | B25C 1/06 |

* cited by examiner

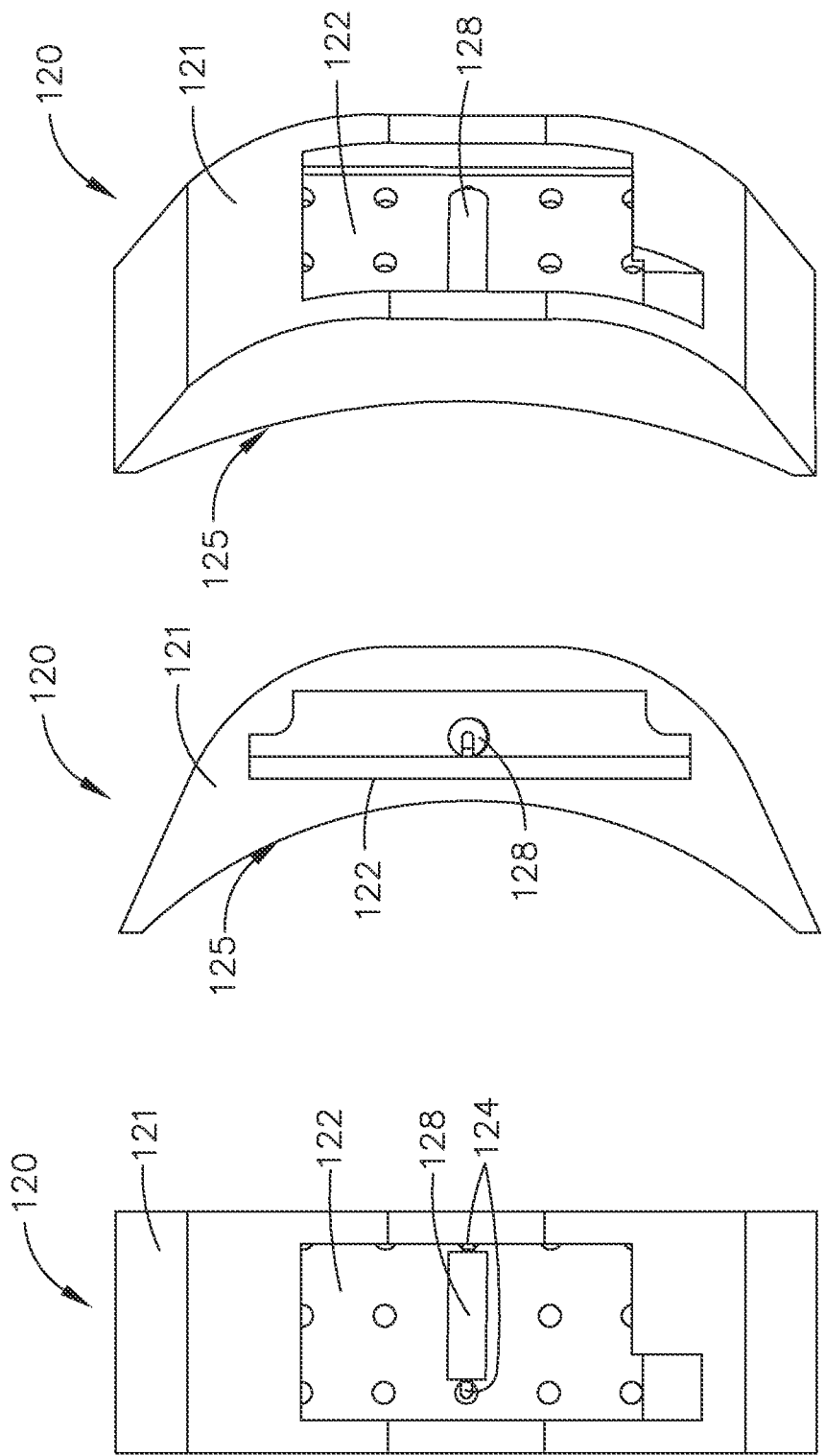

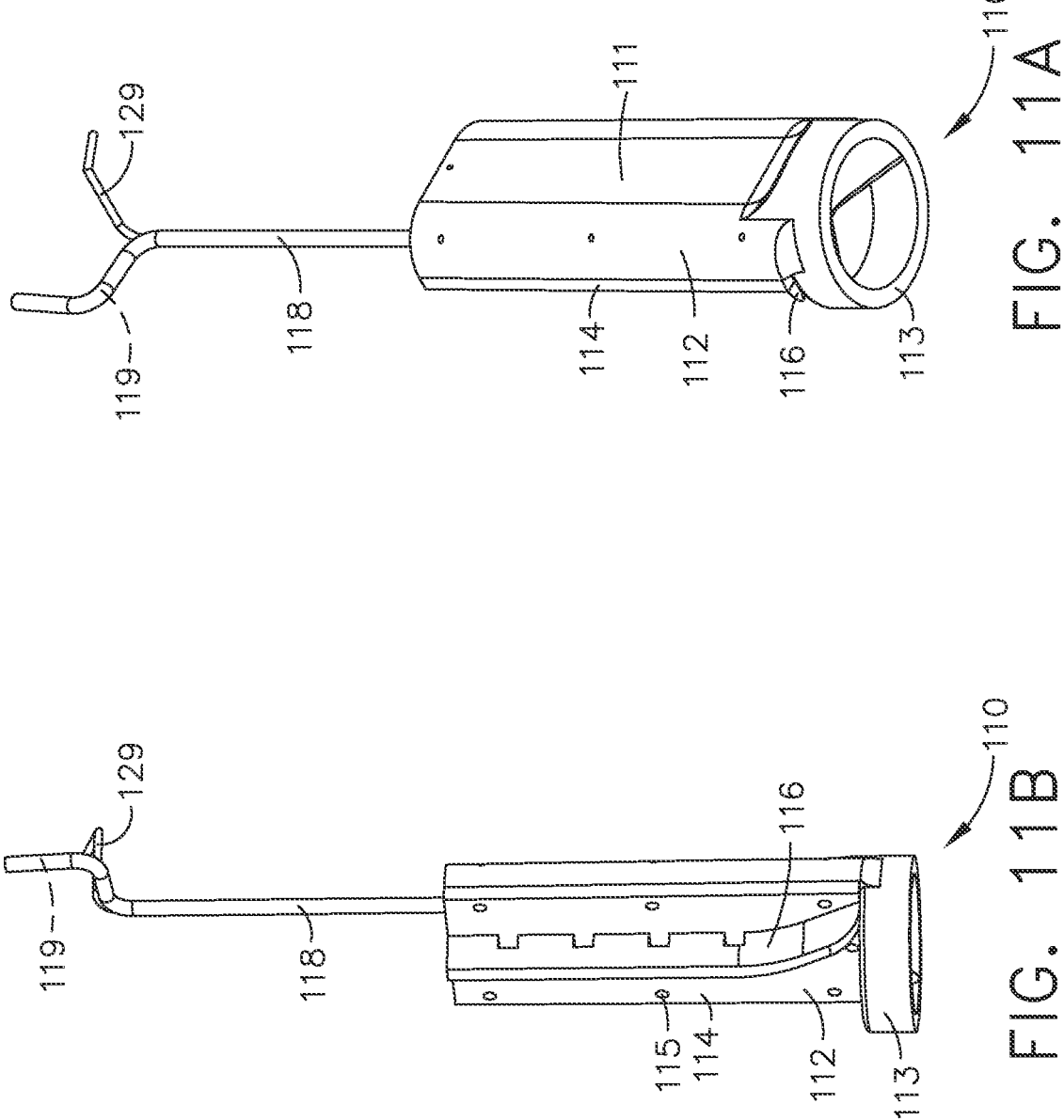

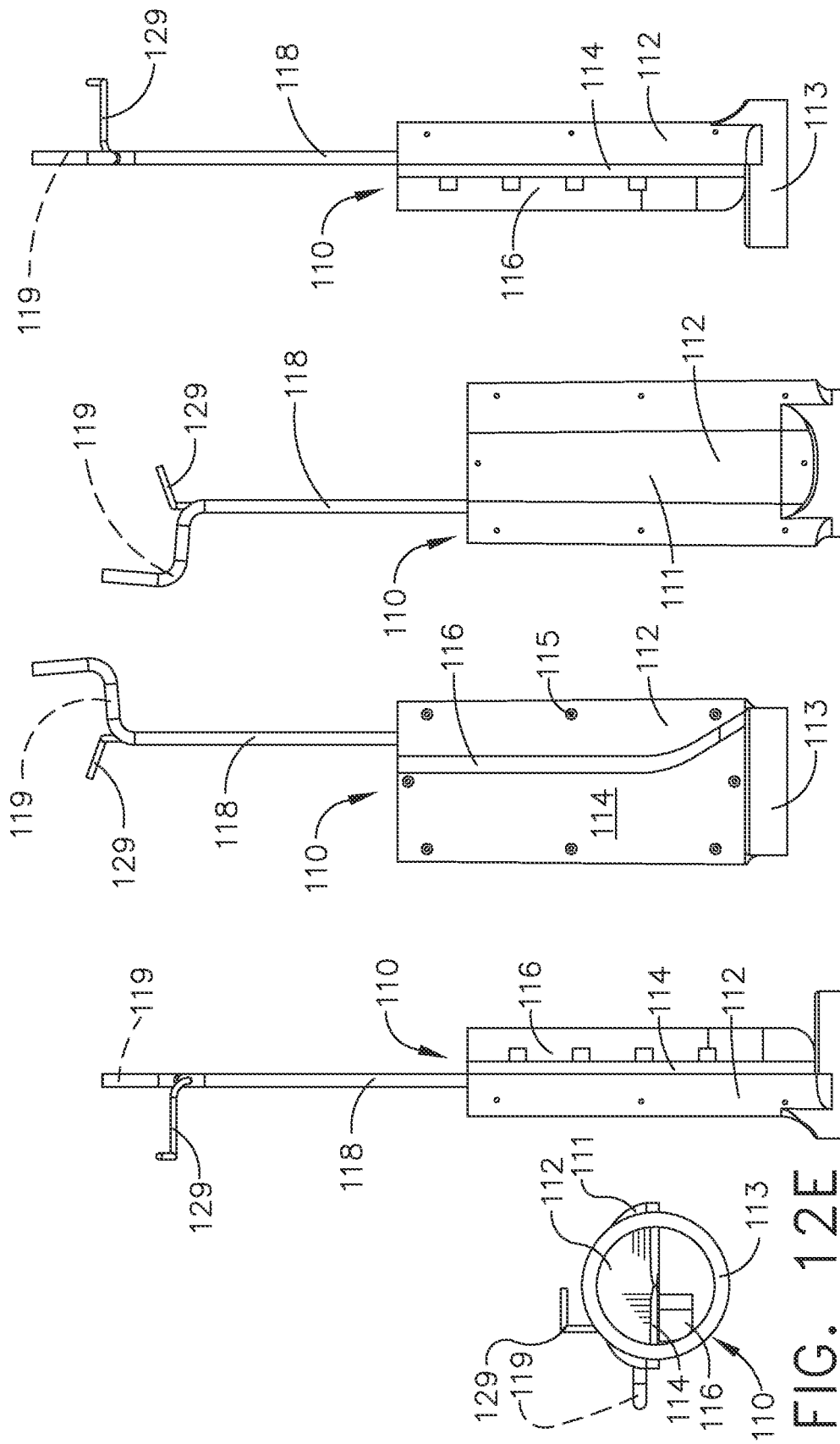

PNUEMATIC FASTENING TOOL WITH WIRELESS SENSOR PACKAGE

CROSS-REFERENCE TO RELATED APPLICATIONS

The present application claims priority to provisional patent application Ser. No. 63/088,164, titled "PNEUMATIC FASTENING TOOL WITH WIRELESS SENSOR PACKAGE," filed on Oct. 6, 2020.

TECHNICAL FIELD

The technology disclosed herein relates generally to pneumatic fastener driving tools and is particularly directed to pneumatic driving tools of the type which fire nails or staples into a substrate material. Embodiments are specifically disclosed as pneumatic fastener driving tools having a sensor package that communicates wirelessly to an external radio, thus providing tool operational data to remote locations that can be transmitted easily for tracking and review.

The sensor package includes a first housing sub-assembly that has a battery, a first controller, and a wireless radio. This first housing is enclosed with a cover, so that the pressurized gas used to operate the tool does not interfere with the operation of the controller. This cover exhibits a gas flow deflector which also helps keep the flowing pressurized gas away from the controller. A cable and antenna subassembly (S/A) are connected to the controller at a first end of the S/A, and both exit the first housing through an opening. The cable and antenna are covered so that the flowing pressurized gas does not interfere with their operations.

The sensor package includes a second housing sub-assembly with at least one sensor. The covered cable is connected to the sensor package at a second end (of the S/A cable), and this allows communication between the controller and the sensor. The sensor package monitors tool operations and can store that data. The data can later be wirelessly transmitted via the antenna to an external computer for analysis.

An opening is provided in the tool's external housing so that the antenna may be run through from an interior portion to the outer (exterior) portion of the housing. An epoxy, or similar covering, is used to seal that opening and hold the antenna in place, providing protection from ordinary tool use. The antenna covering is removable so that the external housing opening is as small as possible.

STATEMENT REGARDING FEDERALLY SPONSORED RESEARCH OR DEVELOPMENT

None.

BACKGROUND

Pneumatic fastener tools for driving nails or staples are common. Typically, such "air tools" comprise a housing with a working cylinder containing a piston. This piston is connected with a driver blade, which is used to sequentially drive staples or nails into a substrate. One of the most important features of such tools is that there is no electric power needed to work them, because these tools operate mechanically with an external source of pressurized gas.

A common problem with these types of tools is that there is no sophisticated way to monitor usage and operational cycles. Without a source of electrical power, such as a rechargeable battery or line voltage, no electronic monitoring systems can be used in such tools.

SUMMARY

Accordingly, it is an advantage to provide a pneumatic fastener driving tool having a sensor package that runs on an electrical power source and includes a radio with an antenna for wireless communication, and a processing circuit as a system controller.

It is another advantage to provide a pneumatic fastener driving tool having an internal sensor package that runs on an electrical power source, with a first sensor package portion mounted in the handle and a second sensor package portion mounted on the external cylinder wall of the working cylinder, with a covered cable electrically connecting both portions.

It is yet another advantage to provide a pneumatic fastener driving tool having an internal sensor package that runs on an electrical power source and includes a radio with an antenna, in which the tool housing exhibits an opening through which the antenna is run to the outside of the tool.

It is still another advantage to provide a pneumatic fastener driving tool having an internal sensor package that runs on an electrical power source, and an internal housing portion mounted in the handle that contains a system controller.

It is a further advantage to provide a pneumatic fastener driving tool having an internal sensor package that runs on an electrical power source, an internal housing portion that contains a system controller, and the internal housing portion protects the system controller from pressurized gas flow.

It is a yet further advantage to provide a pneumatic fastener driving tool having an internal sensor package that runs on an electrical power source, an internal housing portion, a covered cable portion, and the internal housing portion protects the covered cable portion via a gas flow deflector.

It is a still further advantage to provide pneumatic fastener driving tool having an internal data acquisition system that acquires sensor data and reports that acquired data at predetermined times or events using a wireless data transmission (radio) circuit to a network server, thus making this electronic system an IoT device.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a pneumatic fastener driving tool/machine is provided, which comprises: (a) a working cylinder portion, a handle portion, a magazine portion, a guide body portion, an exit end portion, and an external pressurized gas inlet; (b) an exterior housing that at least partially encloses the working cylinder portion; (c) the working cylinder portion includes: (i) a hollow cylinder with a movable piston therewithin, and an elongated driver that is in mechanical communication with the piston such that movements of the driver are related to movements of the piston; and (ii) a sensor subassembly located on the tool; (d) the guide body portion including a driver track that contains movements of the driver during operation of the tool; (e) the magazine portion including at least one fastener to be fed into the driver track of the guide body; (f) the driver being sized and shaped to push a fastener from the exit end portion of the tool; (g) at least one internal chamber for containing pressurized gas, the at least one chamber including an internal housing subassembly, which comprises: (i) a system controller that includes: a first processing circuit, a first memory circuit, a radio circuit, and an electrical power source; (ii) an internal housing that covers at least a portion of the system controller; and (iii) a gas flow deflector along at least a portion of a surface of the internal housing; (h) an antenna that extends from the first radio circuit through an opening in the exterior housing; (i) the sensor subassembly includes: (i) a sensor; and (ii) a sensor enclosure that mounts to the working cylinder portion; and (j) a signal pathway between the first processing circuit and the sensor, the signal pathway being used for sending sensor data from the sensor to the first processing circuit.

In accordance with another aspect, a pneumatic fastener driving tool/machine is provided, which comprises: (a) a working cylinder portion, a handle portion, a magazine portion, a guide body portion, an exit end portion, and an external pressurized gas inlet; (b) an exterior housing that at least partially encloses the working cylinder portion; (c) the working cylinder portion includes a hollow cylinder with a movable piston therewithin, and an elongated driver that is in mechanical communication with the piston such that movements of the driver are related to movements of the piston; (d) the guide body portion including a driver track that contains movements of the driver during operation of the tool; (e) the magazine portion including at least one fastener to be fed into the driver track of the guide body; (f) the driver being sized and shaped to push a fastener from the exit end portion of the tool; (g) at least one internal chamber for containing pressurized gas, the at least one chamber including an internal housing subassembly, which comprises: a system controller that includes: a first processing circuit, a first memory circuit, a first radio circuit, and a first electrical power source; (h) an antenna that extends from the first radio circuit through an opening in the exterior housing; (i) a sensor subassembly that includes: (i) a sensor; (ii) a second processing circuit, a second memory circuit, a second radio circuit, and an interface circuit that establishes communication with the sensor; and (iii) a sensor enclosure that mounts to the tool; and (j) a signal pathway between the first processing circuit and the second processing circuit, the signal pathway being used for sending sensor data from the second processing circuit to the first processing circuit, using radio signals.

In accordance with yet another aspect, a pneumatic fastener driving tool/machine is provided, which comprises: (a) a working cylinder portion, a handle portion, a magazine portion, a guide body portion, an exit end portion, and an external pressurized gas inlet; (b) an exterior housing that at least partially encloses the working cylinder portion; (c) the working cylinder portion includes a hollow cylinder with a movable piston therewithin, and an elongated driver that is in mechanical communication with the piston such that movements of the driver are related to movements of the piston; (d) the guide body portion including a driver track that contains movements of the driver during operation of the tool; (e) the magazine portion including at least one fastener to be fed into the driver track of the guide body; (f) the driver being sized and shaped to push a fastener from the exit end portion of the tool; (g) at least one internal chamber for containing pressurized gas for use in driving the movable piston in the hollow cylinder; (h) a data acquisition system, comprising: a first processing circuit, a first memory circuit, a radio circuit, and a first electrical power source; (i) an antenna that extends from the first radio circuit through an opening in the exterior housing; (j) the sensor subassembly includes: (i) a sensor; and (ii) a sensor enclosure that mounts to the tool; and (k) a signal pathway between the first processing circuit and the sensor, the signal pathway being used for sending sensor data from the sensor to the first processing circuit; (l) wherein: the first radio circuit transmits the sensor data from the tool to an external wireless computer.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

FIG. 10A is a top plan view of the second sensor sub-assembly of the tool of FIG. 1.

FIG. 10B is a side view of the second sensor sub-assembly of FIG. 10A.

FIG. 10C is a perspective view of the second sensor sub-assembly of FIG. 10A.

FIG. 11A is a rear perspective view of the first sensor sub-assembly of the tool of FIG. 1.

FIG. 11B is a front perspective view of the first sensor sub-assembly of FIG. 11A.

FIG. 12A is a right side elevational view of the first sensor sub-assembly of the tool of FIG. 1.

FIG. 12B is a rear elevational view of the first sensor sub-assembly of FIG. 12A.

FIG. 12C is a front elevational view of the first sensor sub-assembly of FIG. 12A.

FIG. 12D is a left side elevational view of the first sensor sub-assembly of FIG. 12A.

FIG. 12E is a bottom plan view of the first sensor sub-assembly of FIG. 12A.

DETAILED DESCRIPTION

Figure 1:
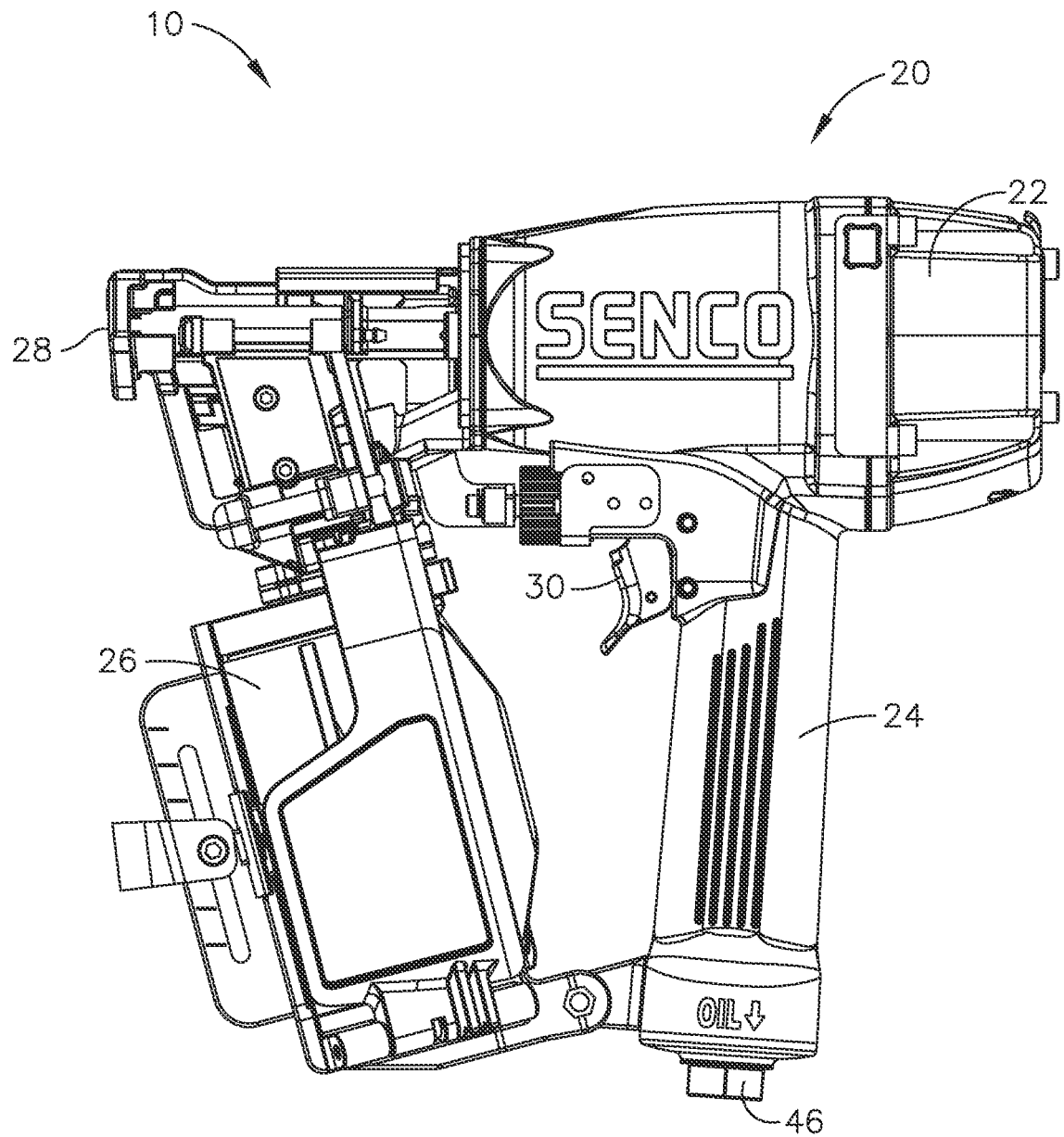
FIG. 1 is a left side view of a pneumatic fastener driving tool with a sensor package, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," or "mounted," and variations thereof herein are used broadly and encompass direct and indirect connections, couplings, or mountings. In addition, the terms "connected" or "coupled" and variations thereof are not restricted to physical or mechanical connections or couplings. Furthermore, the terms "communicating with" or "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not. If a product has moving parts that rely on magnetic fields, or somehow detects a change in a magnetic field, or if data is passed from one electronic device to another by use of a magnetic field, then one could refer to those situations as items that are "in magnetic communication with" each other, in which one end of the "communication" may induce a magnetic field, and the other end may receive that magnetic field, and be acted on (or otherwise affected) by that magnetic field.

The terms "first" or "second" preceding an element name, e.g., first inlet, second inlet, etc., are used for identification purposes to distinguish between similar or related elements, results or concepts, and are not intended to necessarily imply order, nor are the terms "first" or "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the technology disclosed herein may be implemented in software. As such, it should be noted that a plurality of hardware and software-based devices, as well as a plurality of different structural components may be utilized to implement the technology disclosed herein. Furthermore, if software is utilized, then the processing circuit that executes such software can be of a general purpose computer (such as a microcontroller chip), while fulfilling all the functions that otherwise might be executed by a special purpose computer that could be designed for specifically implementing this technology.

It will be understood that the term "circuit" as used herein can represent an actual electronic circuit, such as an integrated circuit chip (or a portion thereof), or it can represent a function that is performed by a processing circuit, such as a microprocessor or an ASIC that includes a logic state machine or another form of processing element (including a sequential processing circuit). A specific type of circuit could be an analog circuit or a digital circuit of some type, although such a circuit possibly could be implemented in software by a logic state machine or a sequential processor. In other words, if a processing circuit is used to perform a desired function used in the technology disclosed herein (such as a demodulation function), then there might not be a specific "circuit" that could be called a "demodulation circuit;" however, there would be a demodulation "function" that is performed by the software. All of these possibilities are contemplated by the inventors, and are within the principles of the technology when discussing a "circuit."

Referring now to FIG. 1, a pneumatic fastener driving tool generally designated by the reference numeral 10 is depicted as seen from its left side. The tool 10 has an outer housing and air cylinder portion 20 having a fastener exit portion 28 at one end and a cap 22 at an opposite, distal end. A removable fastener magazine 26 is mounted near the exit portion 28. The tool 10 also includes a handle 24 having a trigger 30. At one end of the handle 24 is an external gas supply connector 46, typically an air hose fitting.

Figure 2:
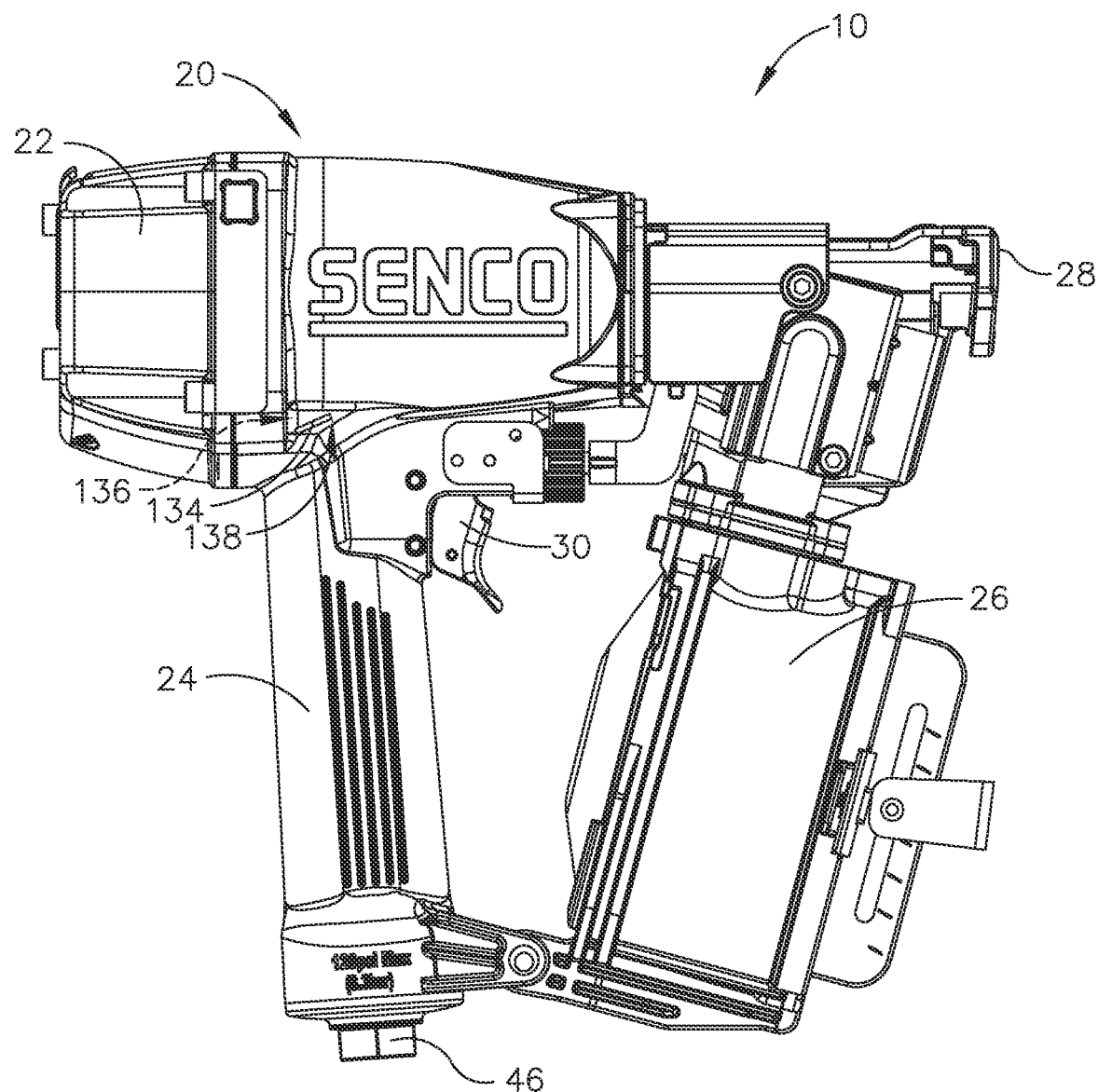
FIG. 2 is a right side view of the tool of FIG. 1.

Referring now to FIG. 2, the tool 10 is depicted as seen from its right side. An external antenna portion 134 is visible just above the handle 24 on the outer housing 20. This external antenna portion 134 is the end portion of an antenna 129 (see FIG. 11A) that is connected to an internal radio circuit (or wireless radio) 160. The antenna 129 exits through an opening (or through-hole) 136 in the outer housing 20. A seal 138 protects the external antenna portion 134 and seals the outer housing 20 so that pressurized gas does not escape. The seal 138 may be an epoxy mixture, as an example.

Figure 3:
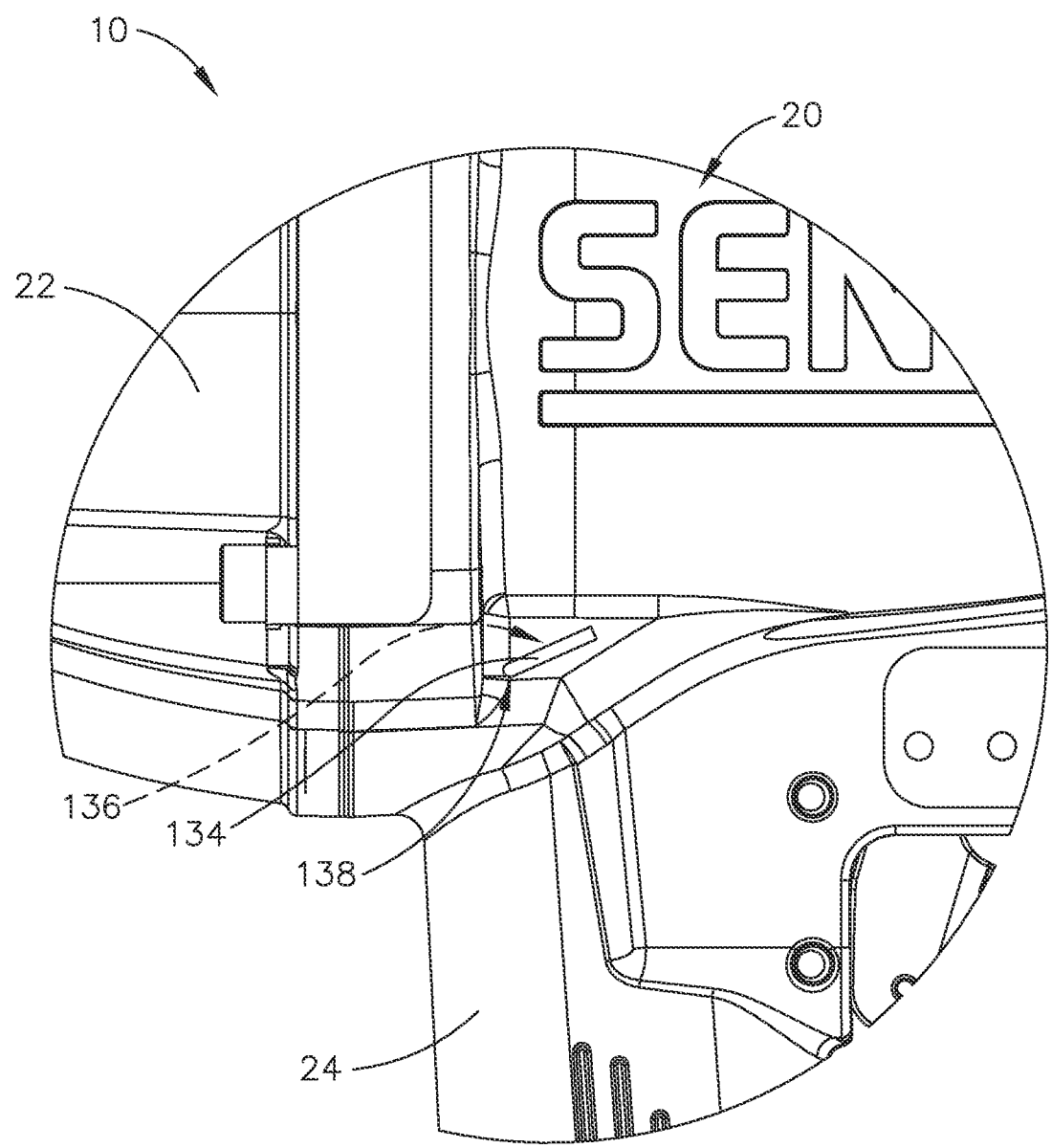
FIG. 3 is an enlarged view of the housing of the tool of FIG. 1 illustrating the external portion of the antenna.

Referring now to FIG. 3, the external antenna portion 134 is depicted in an enlarged view. The seal 138 is necessary to protect, cover, and maintain pressure inside the tool. Throughout a typical workday, the tool 10 may undergo bumps, drops, temperature variations, and other harsh conditions, for example. The seal 138 protects the external antenna portion 134 from damage. The seal 138 also keeps the tool 10 pressurized when compressed gas is present in the tool. Pneumatic fastener driving tools operate on pressurized gas, so without a good seal that pressurized gas would leak out through the opening 136, thus degrading the tool's performance. This seal 138 is a "protected zone" in a recess of the outer housing 20.

Figure 4:
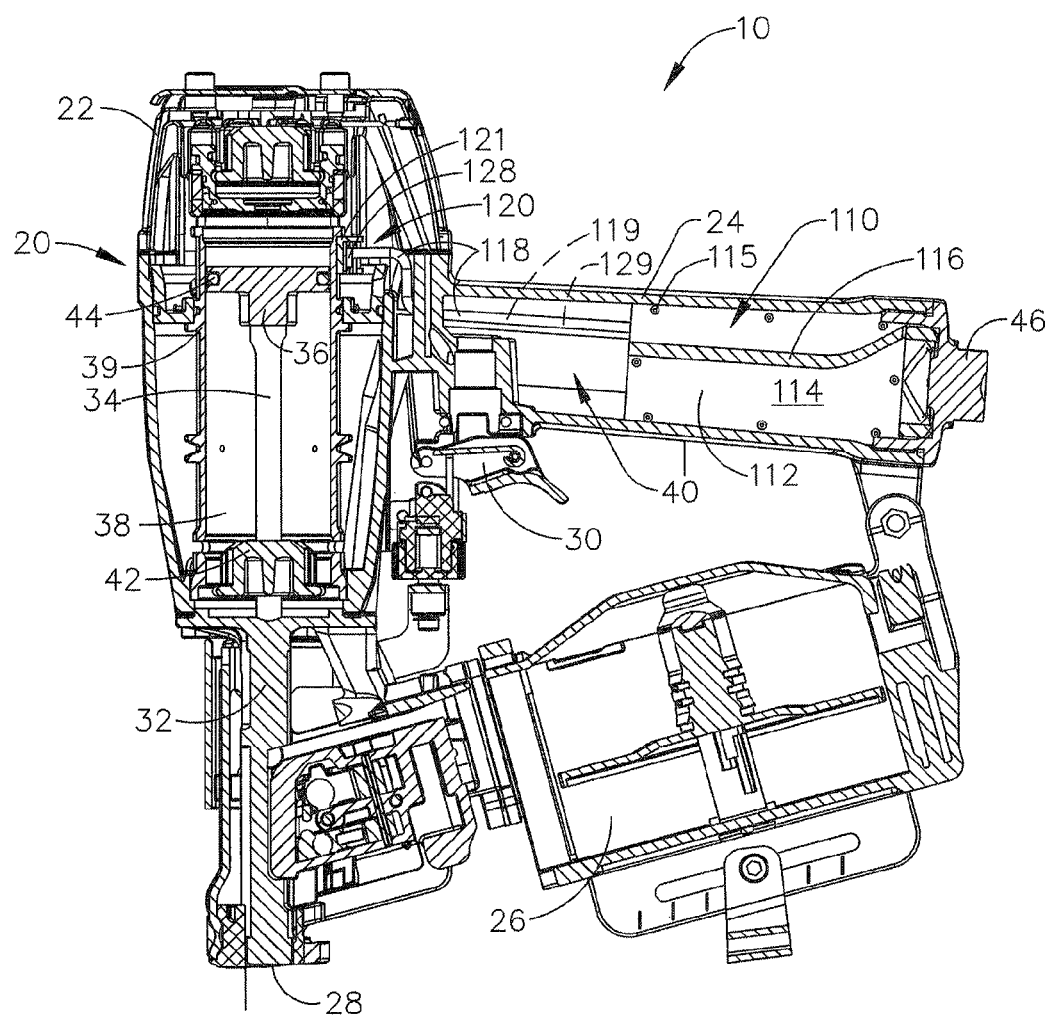
FIG. 4 is a cutaway view of the tool of FIG. 1.

Referring now to FIG. 4, the tool 10 is depicted in a cutaway view. Pressurized gas enters through the external air connector 46 and is temporarily stored in an air chamber 40 inside the handle. When the trigger 30 is pulled, appropriate valves are actuated and the pressurized gas forces the piston 36 towards the exit end portion 28 of the tool 10. A driver (or driver blade) 34 is mounted to the piston 36, and the driver 34 moves with the piston 36. The driver 34 pushes a fastener, received from the magazine 26, through a driver track in a guide body 32, out the exit end portion 28 and into a substrate (a workpiece, such as wood). The piston 36 has a piston seal 44 (such as an O-ring), and the piston is constrained within a working cylinder 38. The working cylinder 38 also contains pressurized gas during operation, first "above" the piston to drive a fastener, then "below" the piston to return it to its initial position at the top of the cylinder. A piston stop 42 is provided to help cushion the piston 36 during operation.

Within the air chamber 40 is a first sensor sub-assembly (S/A) 110, and a second sensor sub-assembly (S/A) 120. (The first sensor S/A 110 can also be referred to as a "system controller" sub-assembly.) The first sensor S/A 110 is mounted in the handle 24, proximal to the external air connector 46. The first sensor S/A 110 includes a first housing 112, a first housing cover 114, and a plurality of cover fasteners 115 that hold the first housing cover 114 to the first housing 112. A gas flow deflector 116 is mounted on the first housing cover 114. This gas flow deflector 116 is shaped in such a way as to keep the main force of the pressurized gas flow away from the internal housing components, and from the internal wiring.

It should be noted that the pressurized gas flowing through the air chamber 40 often includes metal particles, oil, dust, and other particles picked up from using the tool on a jobsite. All of these extra particles need to be kept away from the sensitive circuitry and components residing within the first housing 112. The first housing 112 and its first housing cover 114 keep these particles away from the internal circuitry and other sensitive components mounted inside the first housing 112.

A second (sensor and antenna) cover 118 has a first end connected to the first housing 112, and a second end connected to a second housing 121. This second housing (or 'enclosure') 121 is part of the second sensor S/A 120, and this enclosure 121 is used to mount the second sensor S/A 120 on an external cylinder wall 39 of the working cylinder 38. The second cover (or 'covering') 118 keeps the extra particles in the pressurized gas away from the sensitive cables. Note that the first sensor S/A 110 and the second sensor S/A 120 are electrically connected by a sensor cable 119 (see FIGS. 11A and 11B). The second cover 118 protects the sensor cable 119 and the antenna cable 129.

In the illustrated embodiment, the second housing 121 contains a sensor 128. This sensor may comprise a variety of sensors, depending on what tool metric needs to be measured. A magnetic reed switch may be used, for example, to monitor piston operation cycles. A temperature sensor may be used to measure the internal temperature of the tool, as another example. Other sensors such as a mechanical position sensor (also known as a 'limit switch'), or a pressure sensor (perhaps with temperature compensation), or a shock sensor (to determine if a tool was dropped from an excessive distance or misused—e.g., as a hammer), may also be used, for example.

Figure 5:
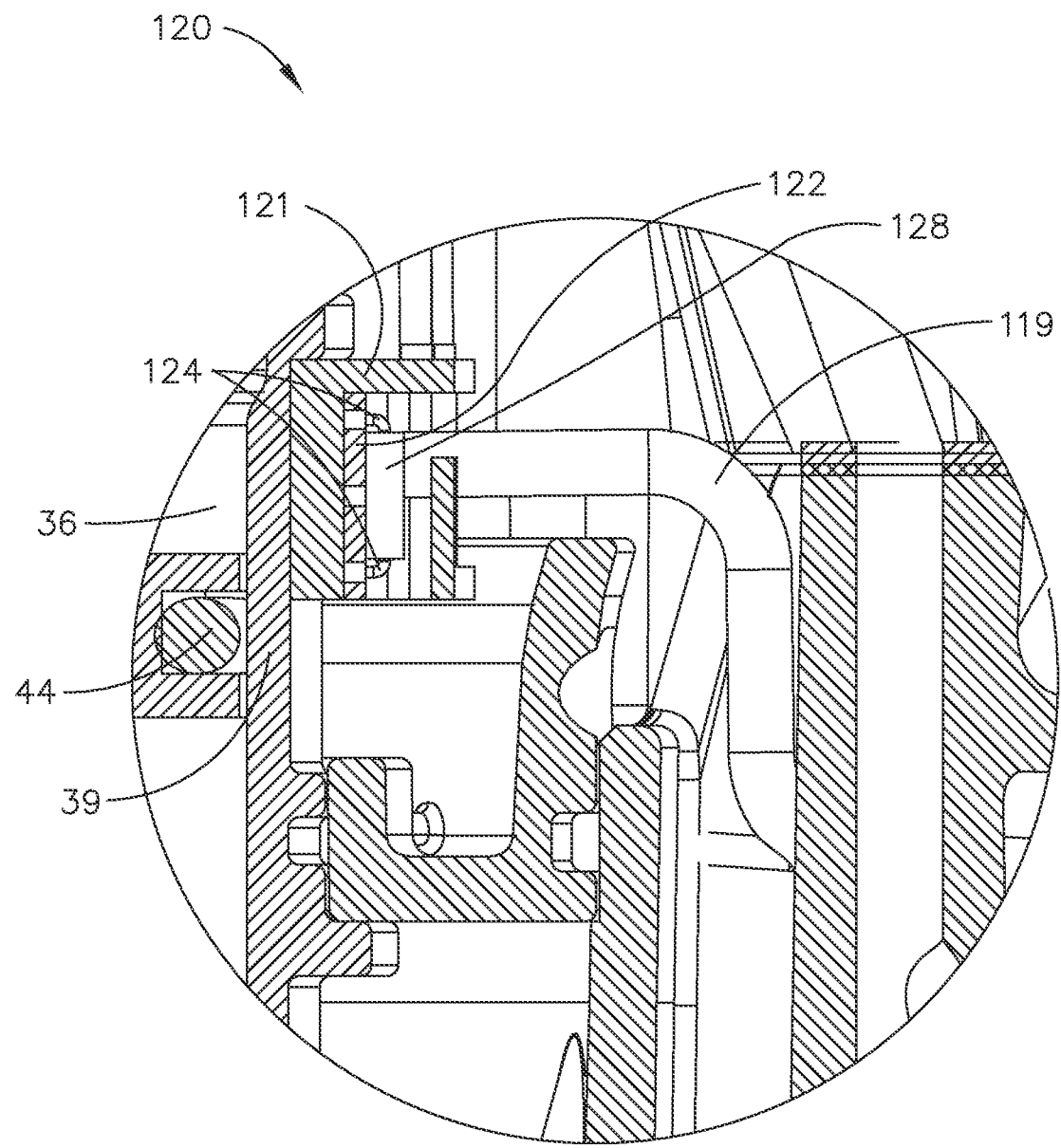
FIG. 5 is an enlarged cutaway view of a second sensor sub-assembly of the tool of FIG. 1.

FIG. 5 depicts an enlarged view of the second sensor S/A 120. The sensor 128 exhibits leads 124 that connect to a second printed circuit board ("PCB") 122. The second PCB 122 is mounted to the second housing 121, and that second housing 121 is mounted to the external cylinder wall 39. The sensor cable 119 connects directly to the second PCB 122. This second housing 121 is mounted proximal to the working cylinder 38 so that the sensor 128 can detect the movements of the piston 36. The sensor 128 may be a reed switch that detects a magnet 126 mounted to the piston (see FIG. 8), for example.

The provision of the two sensor sub-assemblies 110 and 120 makes this overall electronic package a data acquisition system, with wireless reporting capabilities. The first sensor sub-assembly 110 could also be referred to as a "system controller sub-assembly" or a "processor sub-assembly" since it includes a microcontroller or a microprocessor 150 that is programmed to, first, receive sensor data from at least one sensor (e.g., sensor 128), and then to send that data (at predetermined time intervals, or upon predetermined events) to an external computer (e.g., a network server 250). Commercially-available pneumatic "air" tools have not had such on-board data acquisition systems in the past, particularly those with wireless reporting capabilities. This type of sensor and reporting system can also be referred to as an "IoT" device (commonly called the "Internet of Things).

Figure 6A:
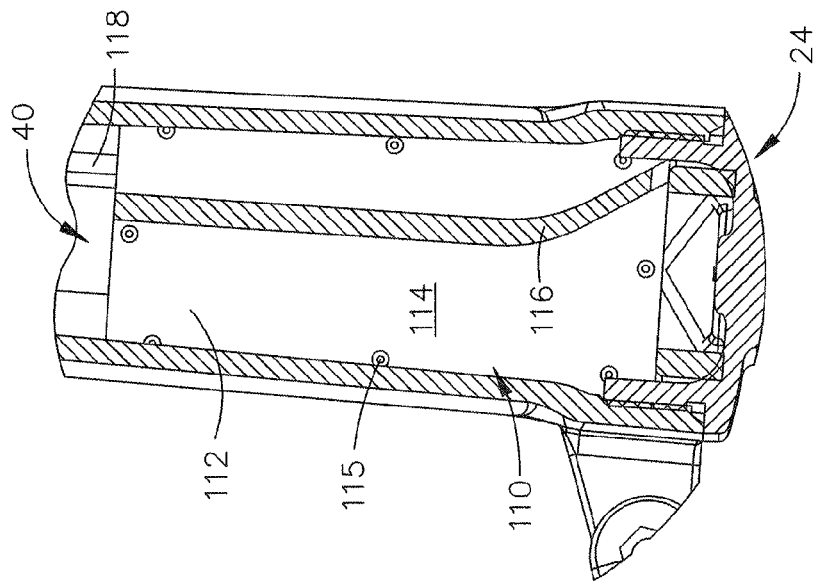
FIG. 6A is a cutaway side view of a first sensor sub-assembly of the tool of FIG. 1 with the internal cover installed.

Referring now to FIG. 6A, the handle portion 24 and the first sensor S/A 110 are depicted in a partial cutaway view. FIG. 6A depicts the first housing cover 114 held onto the first housing 112 via the plurality of fasteners 115. In operation, pressurized gas flows from the bottom and up (in this view) into the air chamber 40. The gas flow deflector 116 directs this gas flow away from the second cover 118, which also deflects the air away from that single opening in the first housing 112. This deflection helps keep particles in the pressurized gas out of the inner elements mounted inside the first housing 112.

Figure 6B:
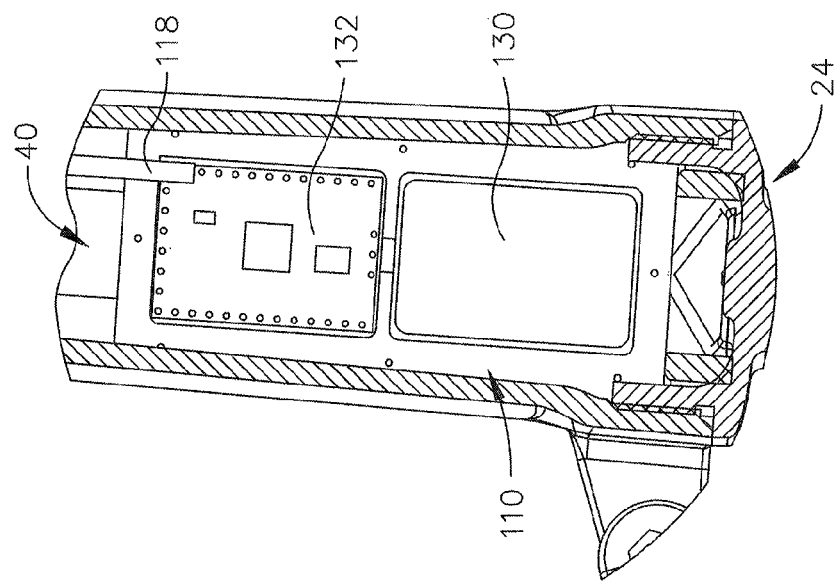
FIG. 6B is a cutaway side view of the first sensor sub-assembly of the tool of FIG. 1 without the internal cover.

Referring now to FIG. 6B, the handle portion 24 and the first sensor S/A 110 are depicted with the first housing cover 114 removed. A battery 130 is mounted inside the first housing 112 that powers the first sensor S/A 110 and the second sensor S/A 120. A first printed circuit board ("PCB") 132 is also mounted inside the first housing 112. This first PCB 132 contains the primary controller and including its memory circuit that contains instructions for executing the software that controls the sensors used in the tool. Note that the sensor cable 119 is directly connected to the first PCB 132 (shown here protected by the second cover 118).

Figure 7:
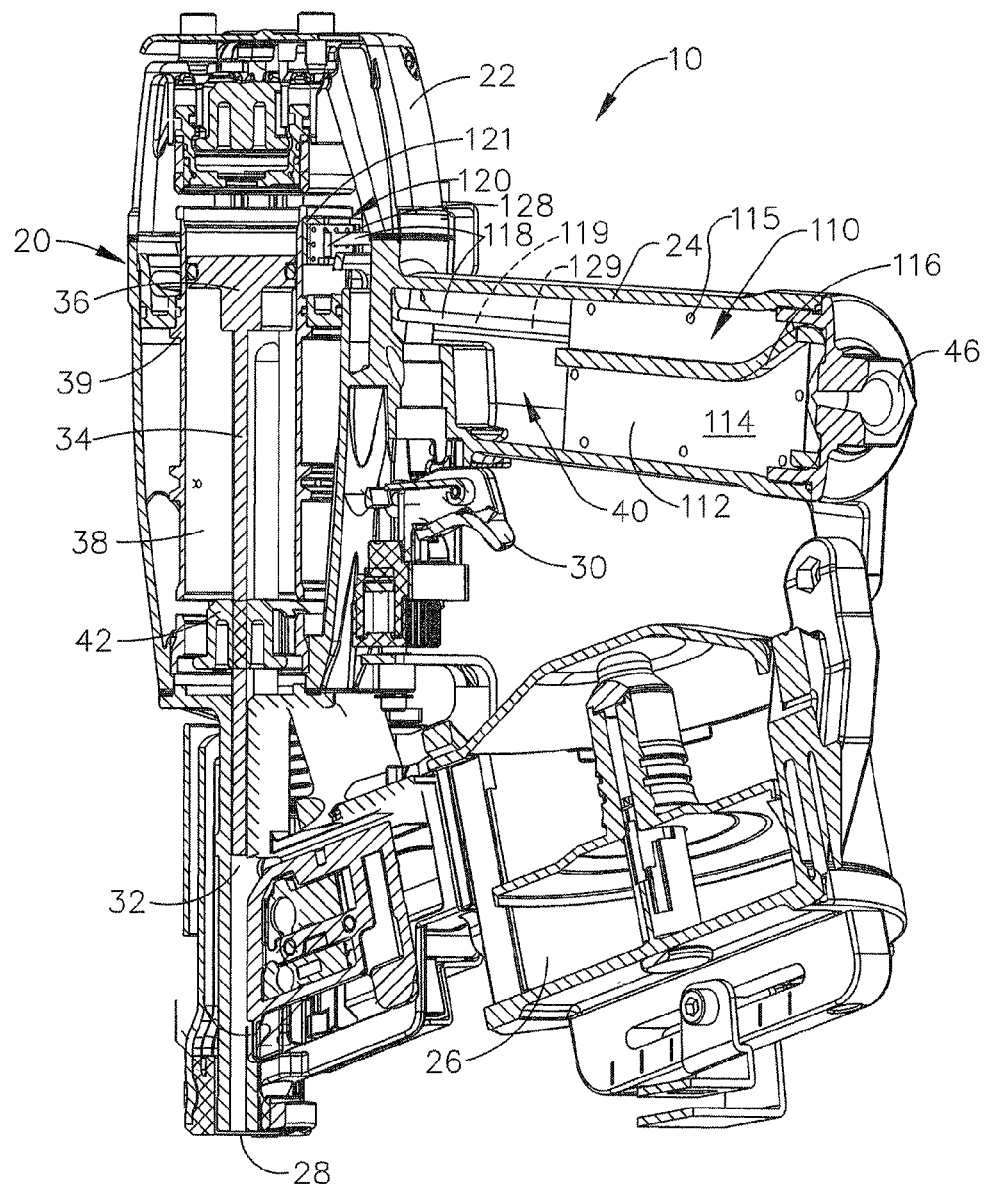
FIG. 7 is a cutaway perspective view of the tool of FIG. 1.

Referring now to FIG. 7, the second cover 118 is shown within the air chamber 40. In order to keep the structural integrity of the tool 10 such that the tool does not break during operation, the air chamber 40 is not a completely open chamber. Several open volumes and passageways inside the tool comprise the air chamber 40, and the second cover 118 runs through one of the openings.

The gas flow deflector 116 extends in a perpendicular direction away from the first housing cover 114. The gas flow deflector 116 may extend (i.e., toward the viewer of FIG. 7) far enough so that it touches the other side of the handle portion 24, so that the incoming pressurized gas is completely forced away from a portion of the first housing 112.

Note that the second sensor S/A 120 is mounted on the external cylinder wall 39 of the working cylinder 38, in a location proximal to the top of the handle 24. This placement is preferred to keep the sensor cable 119 length as short as possible. Of course, the second sensor S/A 120 may be placed in other positions on the external cylinder wall 39, so long as there is room in the air chamber 40 for the second housing 121. Naturally, this would mean extending the length of the sensor cable 119, and would correspondingly increase the length of the second cover 118. In a similar manner, the antenna cable 129 may also exit the outer housing 20 at other locations as well. The length of the antenna cable 129 would need to be increased, as well as the length of the second cover 118. The antenna cable 129 placements depicted in FIGS. 2 and 3 are merely a preferred location, because it keeps the antenna cable length to a minimum, while also maximizing protection with the second cover 118. If the sensor cable 119 and the antenna cable 129 were placed in widely different locations, it is likely that two separate protective covers would be needed, one for the sensor cable, and another one for the antenna.

Figure 8:
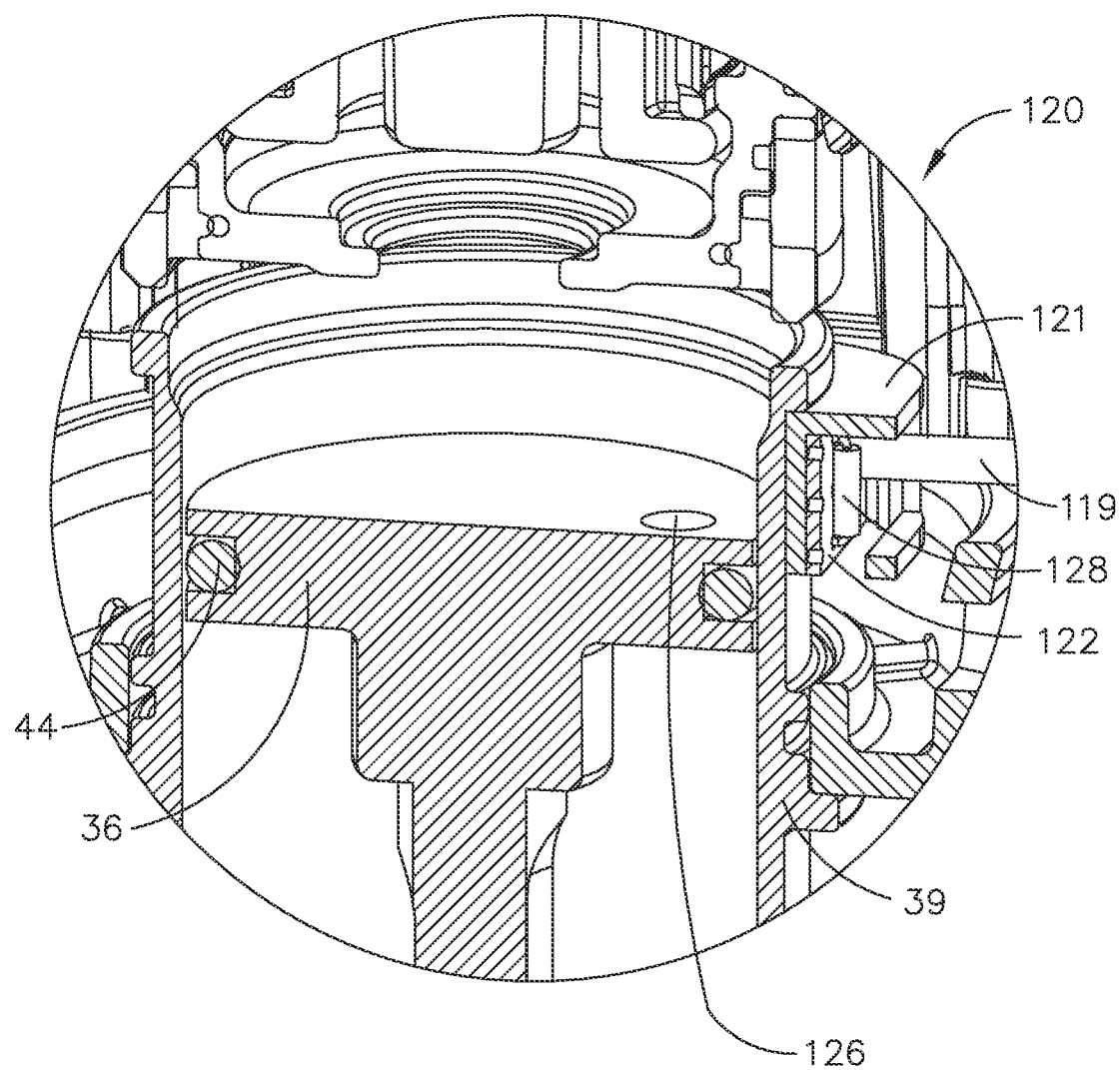
FIG. 8 is an enlarged cutaway perspective view of the tool of FIG. 1 illustrating the second sensor sub-assembly.

Referring now to FIG. 8, the sensor 128 is depicted proximal to a magnet 126 that is mounted on the piston 36. In FIG. 8, the preferred sensor is a reed switch, which detects the presence of the magnetic field generated by the magnet 126, its change of state is detected by the controller, which then determines the number of piston operating cycles. However, the sensor 128 may comprise other types of sensors, such as a Hall Effect sensor, which can also detect the presence of a magnetic field.

Figure 9A:
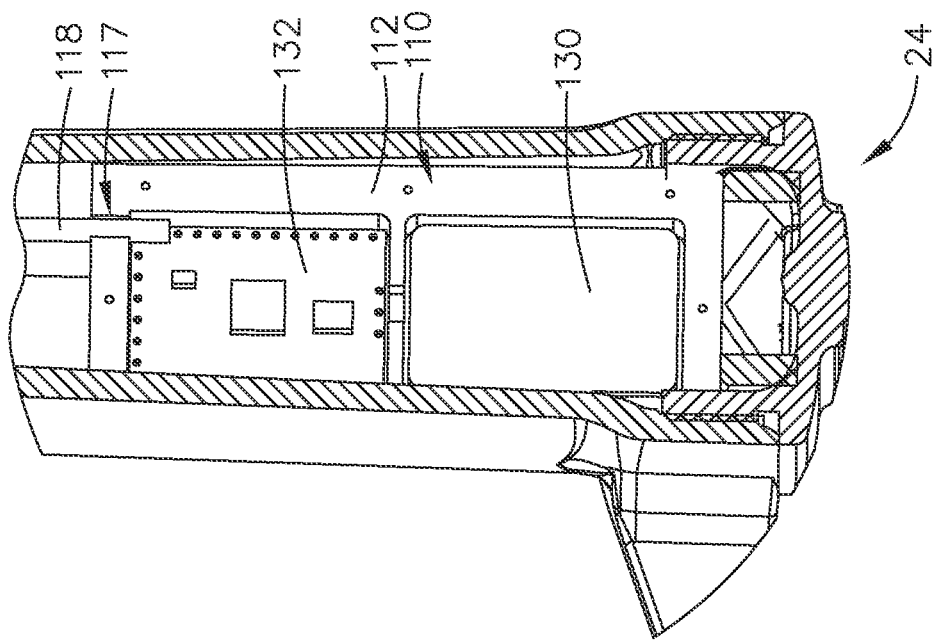
FIG. 9A is a cutaway perspective view of the first sensor sub-assembly of the tool of FIG. 1 without the cover.

Referring now to FIG. 9A, the first sensor S/A 110 is depicted without the first housing cover 114. The battery 130 and the first PCB 132 are mounted at a slight depth inside the first housing 112. In other words, the battery 130 and the first PCB 132 are not flush with the first housing cover 114. The first housing includes a cable opening 117, depicted here with the second cover 118 (acting as a protective sheath, or cable outer jacket) running through the opening. This cable opening 117 is the primary location for dirt and particles to enter the first housing 112, and is one reason for the particular placement of the gas flow deflector 116.

Figure 9B:
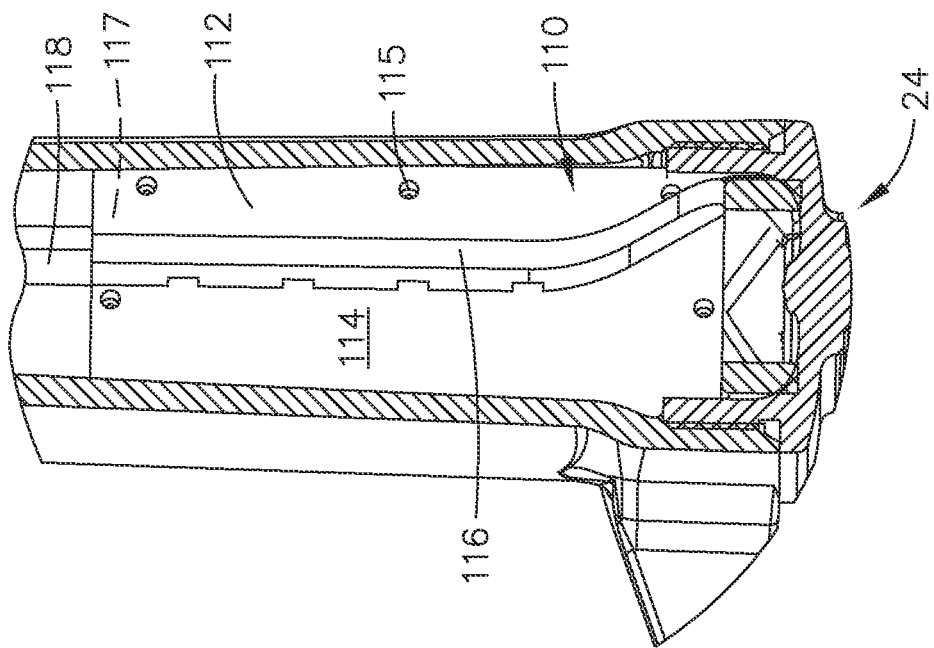
FIG. 9B is a cutaway perspective view of the second sensor sub-assembly of the tool of FIG. 1 with the installed cover.

The gas flow deflector 116 runs from the external gas connector 46 to the end of the first housing 112, as depicted in FIG. 9B, and deflects the incoming pressurized gas away from the cable opening 117. The cable opening 117 is on one side of the gas flow deflector 116, and the incoming gas from the external gas connector 46 is on the opposite side of the gas flow deflector. Of course, once the air chamber 40 is filled with pressurized gas, the gas flow deflector 116 no longer deflects any gas flow away from the cable opening 117 until the next driving cycle occurs. Once the tool 10 drives a fastener, the air chamber 40 is then quickly refilled and the gas flow deflector 116 deflects the rush of incoming pressurized gas away from the cable opening 117.

FIGS. 10A-10C depict the second sensor S/A 120. In FIG. 10A, the sensor 128 is mounted to the second PCB 122 via electrical leads 124, all mounted within the second housing 121. In FIG. 10B, the second housing 121 is depicted with a large curved portion 125, and this curved portion 125 mates to the external cylinder wall 39. Note that, in this embodiment, the second PCB 122 is flat inside the second housing 121. It will be understood that the size and shape of the sensor enclosure (or 'housing') 121 can be readily altered to fit various types, sizes, and shapes of sensors. For example, if the sensor is a strain gauge, the enclosure may be a relatively thin layer of a protective material or a costing, which is applied to a surface of the tool by some type of adhesive.

Referring now to FIG. 10C, the second PCB 122 is shown mounted deep within the second housing 121. The sensor 128 extends in a perpendicular direction away from the second PCB 122, and this deep mounting of the PCB 122 partially protects the sensor 128. The sensor 128 is mounted near to the curved portion 125, so that it can easily detect movements of the magnet 126 mounted on the piston 36.

FIGS. 11A and 11B depict the first sensor housing 110 as well as the sensor cable 119 and the antenna cable 129. FIG. 11A shows a bottom portion 111 of the first housing 112 that is opposite the first housing cover 114. Note that the gas flow deflector 116 can be seen right next to a circular portion 113. This circular portion 113 is mounted next to the external gas connector 46. Note also how the sensor cable 119 and the antenna cable 129 split off at the opposite end. This is due to the fact that the antenna cable 129 exits through the outer housing 120. It should be noted that, if the antenna cable 129 would not exit the outer housing 120, then the materials that the tool is constructed with may dampen, or block, the radio signal being transmitted through the antenna cable 129. In the illustrated embodiment, once the antenna 129 exits the outer housing 120, a clear radio signal can be transmitted.

Referring now to FIG. 11B, the gas flow deflector 116 is shown, along with another view of the split between the sensor cable 119 and the antenna cable 129. It should be noted that the second cover 118 does not fully extend to the portion of the antenna cable 129 where it splits off from the sensor cable 119, although a protective sheath (or jacket) could be included for each separate component, if desired.

FIGS. 12A-12E depict more views of the first housing S/A 110. FIG. 12A depicts the gas flow deflector 116 extending away in a horizontal direction (in this view) from the first housing 112. FIG. 12B illustrates the bottom portion 111 opposite the first housing cover 114. FIG. 12C shows the first housing cover 114 including the gas flow deflector 116. FIG. 12D is the opposite side view of FIG. 12A.

Referring now to FIG. 12E, the first housing S/A 110 is shown to the viewer of FIG. 12 E looking through the external gas connector 46. Incoming pressurized gas flows through half of the circular portion 113, below the first housing cover 114, and to the right (in this view) of the gas flow deflector 116. No gas flows above the first housing cover 114, because the first housing top cover 112 is solid, as depicted in FIG. 12E.

Figure 13B:
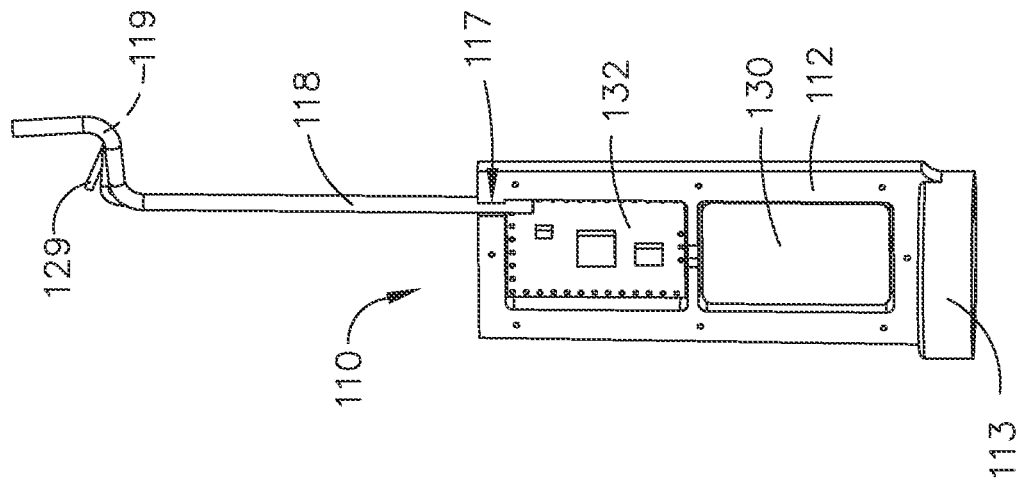
FIG. 13B is a front elevational view of the first sensor sub-assembly of FIG. 12A without the cover.
Figure 13A:
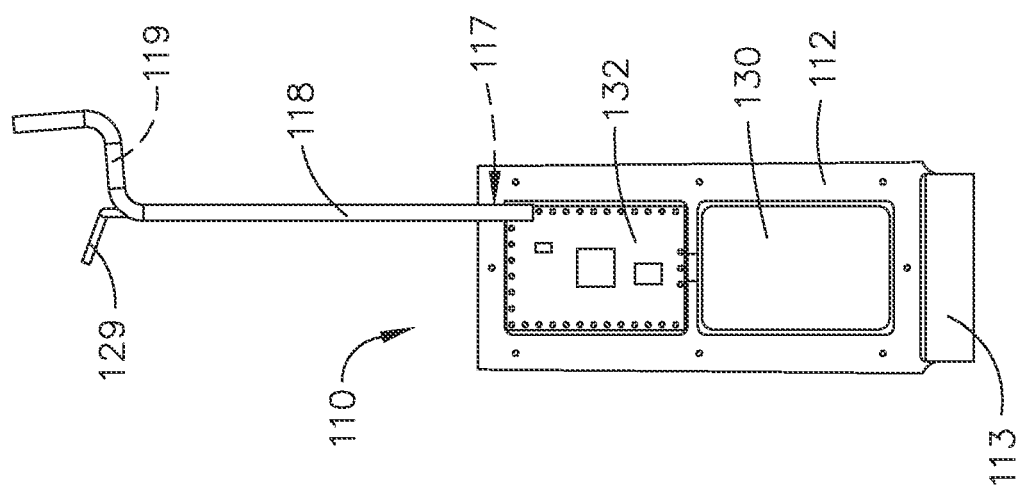
FIG. 13A is a front perspective view of the first sensor sub-assembly of FIG. 12A without the cover.

Referring now to FIG. 13A, the first housing 112 is shown with the first housing cover 114 removed. The battery 130 and the first PCB 132 are shown mounted somewhat recessed within the first housing 112, so that each component is not flush with the first housing cover 114.

Referring now to FIG. 13B, the first housing 112 is again depicted without the first housing cover 114. Note that in this face-on view, it can be seen that the circular portion 113 is not quite as wide as the first housing 112.

Figure 14:
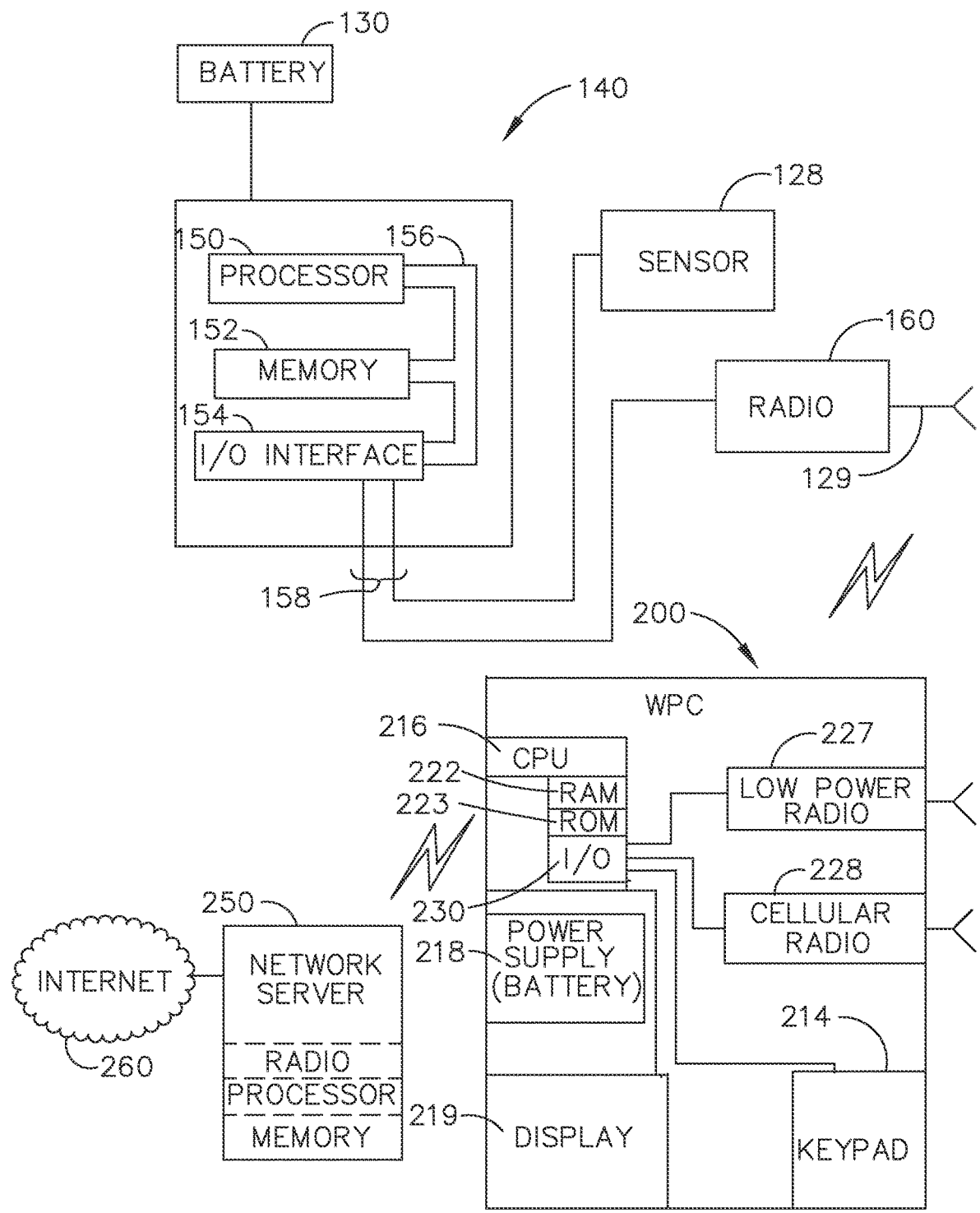
FIG. 14 is a block diagram showing some of the major electronic and electrical components for the fastener driving tool of FIG. 1.

Referring now to FIG. 14, a hardware circuit block diagram is provided, showing a system controller 140. The tool's system controller will typically include a microprocessor or a microcomputer integrated circuit 150 that acts as a processing circuit (or "CPU"). The battery 130 provides power to the first and second sensor S/A 110 and 120. At least one memory circuit 152 will also typically be part of the system controller 140, including Random Access Memory (RAM) and Read Only Memory (ROM) devices. To store user-inputted information (if applicable for a particular tool model), a non-volatile memory device would typically be included, such as EEPROM, NVRAM, or a Flash memory device.

The processing circuit 150 communicates with external inputs and outputs, which it does by use of an input/output interface circuit 154. The processing circuit 150, memory circuit 152, and the (I/O) interface circuit 154 communicate with one another via a system bus 156, which carries address lines, data lines, and various other signal lines, including interrupts, as determined by the system designer.

The I/O circuit 154 has the appropriate electronics to communicate with various external devices, including input-type devices, such as sensors and user-controlled switches, as well as output-type devices, such as a motor and indicator lamps if such electrical devices are to incorporated in a specific tool model. The signals between the I/O interface circuit 154 and the actual input and output devices are carried by signal pathways, typically a number of electrical conductors, grouped under the general designation 158.

The input devices for the tool 10 can include various sensors, including the magnetic sensor 128. One of the output devices includes the wireless radio 160, which is used to communicate with an external wireless computer or a wireless network server 250.

A data interface in the form of the wireless radio 160 is included in this embodiment so that the CPU 150 is able to communicate with other external devices, such as a separate wireless portable computer 200 that uses a compatible wireless data link. (The wireless portable computer can also be referred to as a "mobile device," a "WPC", or a "smart phone" in some embodiments of this technology.) The wireless portable computer 200 also includes a low power radio 227, which communicates the with wireless radio 160 using a protocol that could be proprietary, if desired. However, the radios 160 and 227 could use any number of various communications protocols, such as Bluetooth, although the data structure in the messages between radios 160 and 227 certainly could be encrypted, or otherwise formatted in a proprietary manner Radios 160 and 227 further could comprise other types of wireless communications devices that may not operate on a strictly radio principle, including types of wireless communications devices that have not been invented as of yet. In this description, such wireless communications devices will typically be referred to as "radios;" however, in this patent document they may also be referred to as a "short range wireless communications device," or a "low power wireless communications device."

The wireless portable computer 200 includes a microprocessor (CPU) 216, random access memory (RAM) 222, read only memory (ROM) 223, and an input/output interface circuit 230. The low power radio 227 communicates data to and from the CPU 216, via the I/O circuit 230. The wireless portable computer 200 also includes a display 219, a keypad 214, and a power supply 218 (typically a battery). Note: particularly on a smart phone or wireless tablet computer, the display 219 and the (virtual) keypad 219 may be combined into a single overall structure, known as a "touch-screen display."

Using a wireless portable computer 200 within range of the tool 10 allows a user to remotely access information stored on the tool. The various sensor data can be downloaded for analysis, and firmware can be uploaded. If location technology is installed in the tool 10, such as a global position system (GPS) receiver, then the tool's geographic location can be monitored as well. In some jobsites, knowing the geographic location of the tool while in use can provide additional information about user behavior, such as whether the tool is being used in a production area of the building, a repair area of the building, or perhaps in a maintenance area of the building.

The tool's wireless radio 129 is also designed to have the ability to "connect" to a network server 250, using a radio link. This is a primary way for the data being gathered by the tool's system controller 150 to transfer the sensor data to a remote central computer, over the Internet 260, for example. The network server 250 could, by itself, include some or all of the capability to act as the central computer, if desired. However, in many if not most situations, the data being acquired by the sensor package for a given 'instrumented' tool 10 will be transferred to a remote location that is off-site from the building where that tool 10 is actually being used. Therefore, an appropriate network server 250 will of course include a computer with memory for storing that tool's data, but it will also include a communications circuit for sending the tool's data to a remote central computer, typically over the Internet 260, and potentially, to the "cloud" for temporary storage until it is convenient for personnel to retrieve that data from the "cloud" for downloading to the central computer.

The WPC 200 may also include a cellular radio 228, which would be typical if the WPC is an intelligent cellular phone, commonly known as a smart phone. In that case, the user of the WPC 200 would have the ability to contact a central computer over the Internet, if that was desirable, even while the user was in contact with the tool's wireless radio 129. It would be further possible for such an authorized user to 'manually' transfer the tool's acquired data first to the smart phone (the WPC 200), and then to the Internet 260 as a manual upload that would eventually be sent (downloaded) to the central computer, in the event that the network server 250 was off-line for whatever reason. This type of operation would probably not be standard operating procedure, but it would certainly be within the capability of this overall system, as diagrammed on FIG. 14.

Figure 15:
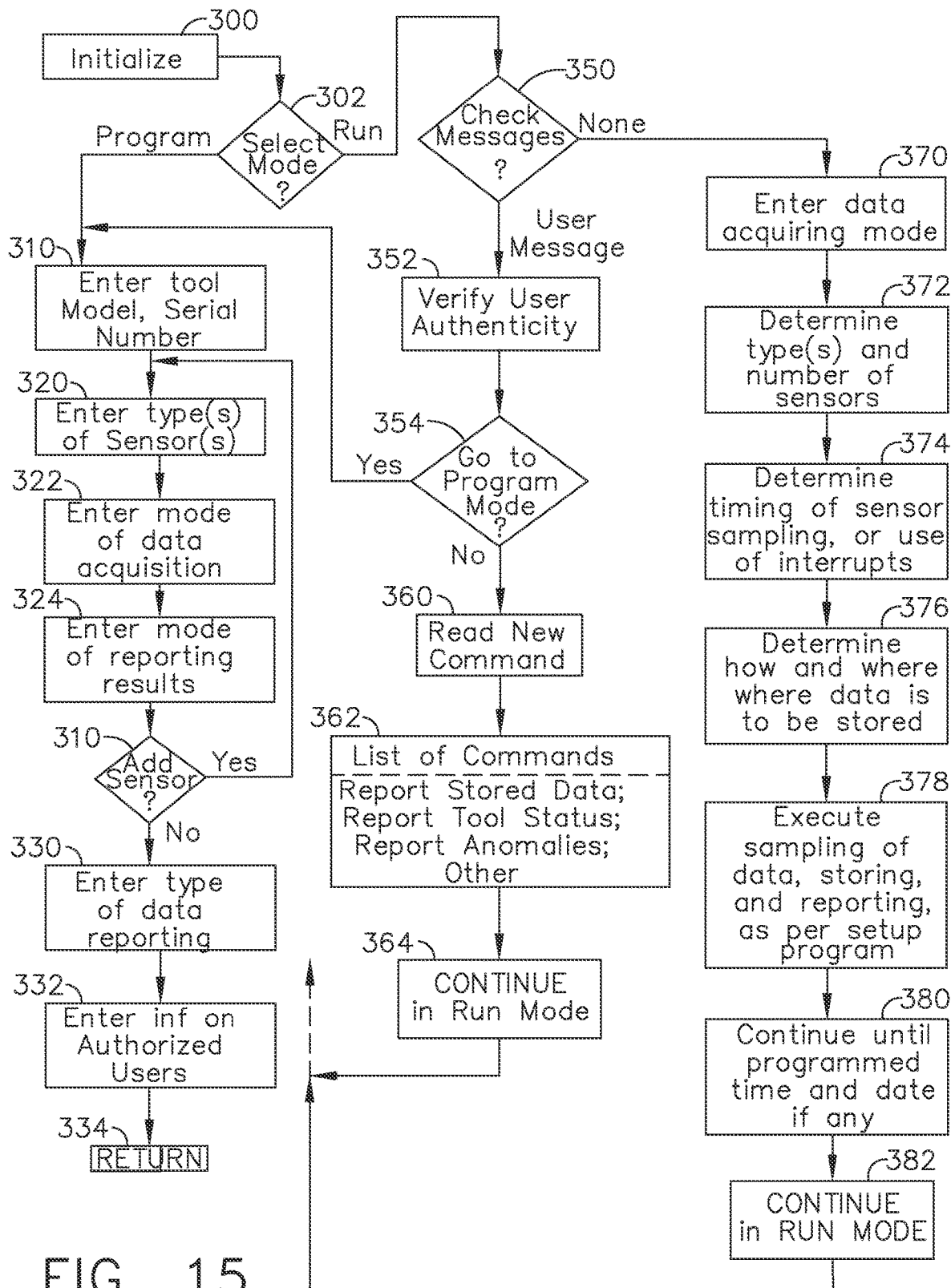
FIG. 15 is a flow chart showing some of the important logic steps that are recommended for use with the system controller.

Referring now to FIG. 15, a flow chart is presented showing some of the important logic steps that are recommended for use with the system controller 140 that is mounted in the air tool 10. When the power is first turned on to the system controller, the microcomputer 150 will initialize its variable states at a step 300. A decision step 302 will then determine whether the controller 140 should enter its "Run" mode, where it executes programming as a data acquisition system, or whether it should enter its "Program" mode, where the controller allows itself to be set up by another entity.

Program Mode

If the result of step 302 is "Program," then the system controller will expect to receive information from an outside source, typically either a human being who is using a wireless portable computer, such as a smart phone or a wireless tablet computer, (item 200 on FIG. 14, for example), or the outside source could be a central computer that communicates via a network server to send instructions to the system controller 140 on the tool. Generally speaking, the system controller 140 will always need to be "set up" at least once (as discussed below), and it should have the capability of being set up, either entirely or partially, later to either change some of its setup attributes, or to allow that same controller 140 to be dismounted from a first air tool and then emplaced into a second air tool, if desired.

In this portion of the written description, it will be assumed that the system controller 140 is a brand new component that is awaiting data that will allow itself to be configured to operate in a specific air tool. At a step 310, the outside source will enter a specific tool model number and serial number, or other equivalent information that will allow this particular system controller to be identified with a single tool. That type of information would be stored in non-volatile memory in the memory circuit 152 of the system controller, and should not be altered unless that given system controller 140 is going to be dismounted from that given tool. This step could be called the "mating step" of the controller to the tool.

Once the system controller 140 is mated to a specific tool 10, a series of steps will need to be performed to configure the actual "use" of that system controller. A step 320 will now be performed that informs the system controller what type (or types) of sensor(s) will be mounted on this specific tool 10, and also how many overall sensors there will be on this tool that need to be monitored by this system controller. There may be only a single sensor, but that information nevertheless needs to be provided to the system controller, either hard-coded in the controller's memory, or uploaded to that memory during the step 320. This type of information would likely include proprietary designations for various types and models of sensors that may be mounted on various types of air tools, for example, that will be distributed by the tool manufacturer.

It will be understood that there could be many different types of sensors mounted on several different models of tools; a single tool could have two pressure sensors, for example, and those sensors could be of two different model numbers—one sensor for a first pressure range, and a second sensor for a different, second pressure range. Of course, there could be two or three different sensors on a single tool, and each sensor could be of a different type; for example, there could be a magnetic proximity sensor, a pressure sensor, and a shock load (force, or acceleration) sensor, all mounted to that one tool, and all communicating with that single system controller 140.

At a step 322, the "mode" of data acquisition can now be determined for a given tool. (Note: by "determined," this information would normally be uploaded to this system controller by the outside entity; or there could be a default value that would be read by the system controller, as part of this setup mode.) Typically, a certain type of sensor will output its data either as a digital (On-Off, or binary) signal, or as an analog signal over a given voltage range. For example, a thermostat could produce a "high temperature alarm" signal as a digital signal. Or, a temperature sensor could be used to produce an analog voltage over a predetermined temperature range (e.g., a voltage range of 0 to 5 volts DC, corresponding to a temperature range of 0 to 100 degrees Centigrade), and that analog voltage will be sampled by an A/D (analog-to-digital) converter to create a numeric value that will be understood by the system controller 140; then, a threshold value that represents a "high temp alarm" could be numerically compared to that numeric value (of the input signal) to determine if there exists a high temperature condition, or not. These concepts are well understood by engineers and other system designers who work with data acquisition systems.

As another example, a digital signal counter could be implemented to keep track of how many operating cycles the tool 10 has undergone, over time. Assuming a proximity sensor is used that has a digital output, then a voltage or current pulse (either positive-going or negative-going) would be output from that sensor each time some structural member of the tool passes by that proximity sensor. If the proximity sensor is magnetic-sensing, then a permanent magnet could be mounted to that structural member, for example, and as the magnet passed the "detection zone" of that magnetic proximity sensor, it would change states.

In any event, once it has been established in the tool's design that a digital signal will be produced by a sensor to count operating cycles, then the way (or "mode") those counts are detected (or "acquired") by the system controller 140 has many possibilities. For example, each count pulse could be directly detected by the microcontroller 150, either by using an interrupt line on that I.C. chip, or by continuously sensing that input signal line (e.g., as a "data" line, or as a digital input line on that I.C. chip). Or, an additional hardware counter chip (not shown on FIG. 14) could be added to the system controller 140, in which that counter continuously monitors the proximity sensor's output signal, and accumulates a predetermined number of counts before the counter outputs a digital signal to the microcontroller 150. In that manner, the frequency of interrupts to the microcontroller could be minimized to acquire that count information.

At a step 324, the "mode" of reporting the results of this data gathering activity can now be determined for a given tool. (Again, this type of information would normally be uploaded to this system controller by the outside entity; or there could be a default value that would be read by the system controller, as part of this setup mode.) And, it will be understood that the method and frequency of reporting results may vary significantly, depending on the type of sensor being monitored by this system controller. For example, a digital output sensor would likely produce either "cyclic data" or "threshold data." In other words, if cycle counts are being monitored and accumulated by the system controller 140, then the timing and other configurable information will need to be specified, so the system controller will know how to store and report the resulting data. For example, the system controller could accumulate a given number of "counts" (such as 25 counts, or 100 counts) before reacting; and then that now-exceeded count value to be stored into non-volatile memory on board the system controller 140, which would then contain an accumulated (smaller) integer number that represents a larger number of actual cycle counts. Furthermore, another (perhaps different) threshold value could be used to determine whether the system controller 140 should now send a wireless message to an external wireless computer.

As another example, if the sensor produces an analog output signal, then its value could be tracked over time. If an average value is the desired information, then that analog value can be sampled at predetermined time intervals, and stored in memory, while also being averaged with previously-acquired samples of the same data point. Moreover, a specified time interval could be entered that will inform the system controller 140 to track the average value for that time interval (e.g., one hour), and store that average value (e.g., temperature, or pressure), and then erase the "averaged value" that is being directly sampled, and start over with a new average to be acquired over the next time interval (the next hour).

Furthermore, an analog sensor may produce information that has a "high" and a "low" value that is of interest. For example, a tool's high and low temperature may be desirable to track, and those types of values could be sampled every operating cycle of the tool, if that is an important piece of data, and two different memory locations in the system memory circuit 152 could store the numeric values for the maximum and minimum sensor readings over a specified time interval (e.g., one hour). Once the time interval has run its course, those high and low readings could be transmitted to the wireless network computer, if desired, and a new set of minimum and maximum readings could start to be accumulated for the next hour.

In any event, each sensor that will be mounted on the tool 10 will have some type of configuration information—i.e., its "setup" information—provided to the system controller 140 by operation of steps 320, 322, and 324. Once those steps are completed, a decision step 326 will ask the setup computer (or human user) if there is another sensor that still needs to be configured for this tool(?). If YES, the logic flow is directed back to step 320 for setting up that sensor. If NO, then the logic flow is directed to a step 330.

At a step 330, the "type" or "mode" of data reporting is determined (or "entered" by the external computer or human user). As with any data acquisition system, the system controller 140 needs to learn how often it is to report its acquired data, or whether it is to report its data at all, without receiving some external command. This type of operational function will likely be different for various ultimate users, or for different types of tools, and thus, should probably be configurable at the jobsite. Of course, it is up to the system designer to make such decisions.

If the system controller 140 for a specific tool is to report once a day, for example, it still needs to know exactly what time of day it is to send that report, and to whom (or to what entity). Furthermore, will such a reporting message be sent to an e-mail address, or to a web portal, or simply transmitted through the air as a radio message, not knowing if anyone or anything will hear its message? All this is configurable as a "type of data reporting," and step 330 is to provide those instructions to the system controller 140. Of course, a default setting would likely be provided in firmware for use by the microcontroller 150, in case there is nobody at the jobsite to actually program the system controller 140 when it is time to start using the tool 10.

At a step 332, the system controller 140 is to be provided with information about "who" are the authorized users that will be allowed to provide configuration information, as part of this "Program Mode" that started at step 310. Of course, there would be one or more default settings for use by the "factory" authorized users. But step 332 would allow some of the personnel at the jobsite to be added to the list of authorized users, if that is desirable. It should be noted that the overall software design would likely depend on such authorized users (including at the factory) to "talk" to the system controller 140, including the ability to command the system controller to go into the Program mode in the first place (at decision step 302).

Once the setup configuration is finished, the Program mode will RETURN to other computer operating functions at a step 334. It will be understood that the system controller 140 will likely be designed to operate as a multitasking system, which would allow it to essentially "time share" its processing functions so that it could both be in "Program mode" and in "Run mode" under certain conditions. Obviously, that capability should be limited to being able to re-configure only certain settings while executing functions in both modes, such as the ability to enter additional users at step 332, for example.

Run Mode

Sub-Mode "Receive Message"

If the result at decision step 302 is "Run," then the logic flow is directed to another decision step 350 that determines whether a message has just been received from an external source, such as a human user at the jobsite. If the result is "None," then no message has been received since the last operating cycle, and the logic flow is directed to a step 370, discussed below. However, if the result is "User Message Received," then the logic flow is directed to a step 352 that verifies the authenticity of the user that sent the message.

Such authentication may be performed by any number of passwords or decryption algorithms, as desired by the system designer of this tool/microcontroller system. Of course, if the user's credentials fail the verification step 352, then the logic flow will return to the beginning of the Run Mode (at step 302 to step 350).

Assuming the user's credentials are verified, a decision step 354 will determine whether the user desires to take the tool out of the Run Mode, and instead "goto" the Program Mode. If the answer is YES, then (in this example flow chart) the tool will halt is Run Mode activities and jump to its Program Mode activities, at step 310. In this example, the tool would not continue to operate in both modes, simultaneously.

Assuming the result at step 354 is NO, then the tool continues its functions in the Run Mode, but it also reads a new command that is being entered by the authorized user, at a step 360. The user could be provided with a menu of various types of commands that he or she can implement, by receiving a data message from the tool's system controller 140 that populates a display screen 219 on the user's wireless portable computer 200. A step 362 provides that information to the user, and some of those types of commands could include: (a) command a report to be generated to display the stored data in the system controller's memory 152; (b) command a report that displays the current tool status; (c) command a report that displays any anomalies that have occurred over a predetermined time period—or over the time since the most previous such report was asked for; (d) any other types of appropriate reports or status messages that the tool's designer decides should be available to such authorized users.

Once the "new" command has been entered, the logic flow is directed to a step 364, which continues to operate in the Run Mode (at step 302 to step 350).

It will be understood that the steps discussed above about checking and obeying messages from an external source (i.e., steps 350 through 362) could be generated by a remote computer over a network, such as the Internet. Furthermore, this could be an automatic function, as determined by the entity that is in control of that remote computer. In fact, the reporting functions for this tool's system controller 140 could be set up so as to require such a message to be received from that remote computer before the system controller 140 would send any type of report of operating data, ever. That all depends upon exactly how the tool's system designer decides to program this particular tool, and the flow chart of FIG. 15 provides the flexibility to create a system of instrumented tools that will operate in that manner, if that is the desired goal.

Alternatively, if the tool's system designer desires that the tool should automatically send reports to one or more remote computers at predetermined time intervals, or upon the occurrence of predetermined events, then the flow chart of FIG. 15 also provides that flexibility to create a system of instrumented tools that will operate in that manner (which will be discussed below in greater detail). It should be noted here that, if the tool's system controller 140 is configured (by its setup attributes in the Program Mode) so that it is to automatically report its operating data, then this tool becomes a member of the Internet-of-Things (or "IoT"), which seems to be a trend that is becoming more popular in the electronic communications field.

Run Mode

Sub-Mode "Data Acquisition"

If the result at step 350 is "None," then a step 370 begins (or continues) acquiring data from the sensor(s) that have been mounted on the tool 10. The system controller 140 needs to be informed of the type(s) and number of sensors that are involved for this specific tool. Of course, that information should have been previously entered in the Program Mode before the tool was allowed to enter the Run Mode in the first place.

At a step 372, that configuration (or setup) information is quickly inspected by the microcontroller 150, and the computer software will then continue to execute accordingly. This step 372 is only described here to make clear that this type of system controller may be programmed to jump directly into its Run Mode immediately after initialization (at step 300), and in that event, steps 372, 374, and 376 must be executed so that the system controller knows how to behave in this tool's environment.

At a step 374, the system controller 140 quickly inspects the configuration (or setup) information to determine the "way" the data acquisition sampling is to be achieved. As discussed above, the sensor(s) may be sampled at specified time intervals—particularly for sensors having analog outputs, especially if those are relatively slow-moving outputs, such as with temperature sensors; or perhaps the sensor(s) are to be monitored by counting digital output signals, and perhaps by use of interrupts—including non-maskable interrupts to ensure that the microcontroller 150 does not miss a change of state in one of the digital output signals.

A step 376 is now executed to quickly determine how and where the sampled or gathered data is to be stored. Memory locations in the system controller's memory circuit 152 will be the likely data storage locations, but further refinement is needed here. As specified in the setup data that was entered in the Program Mode (or pre-programmed at the factory), each type of sensor may have more than a single attribute that should be saved in memory. For example, a temperature sensor could produce data that is to be tracked as to its maximum and minimum values, per specified time intervals, and further an average (or an integrated) numeric value could be continuously calculated in real time, and then stored, and re-stored for the "next" time interval, with previous interval values either erased, or first transmitted to an external computer, all as specified in the setup data.

Finally, a step 378 is reached in the logic flow, and the data acquisition functions of the tool's system controller 140 begin to execute by sampling the sensor output signal(s), storing that data as previously configured, and reporting that data as previously configured in the setup Program Mode (or as pre-programmed at the "factory"). These data acquisition steps will continue seamlessly for an indefinite time, unless there is a programmed "halt" function that is to automatically occur at a predetermined time and date, as specified at a step 380.

Until that predetermined time/date (in step 380) is reached, or indefinitely if there is no such halt time, the Run Mode will continue at a step 382, where the logic flow is directed back to the beginning of the Run Mode (at step 302 to step 350).

It will be understood that the logic steps in the flow chart of FIG. 15 demonstrate a flexible system that can be readily altered and shortened, if desired by the system designer. Some of those illustrated steps may not be desirable for certain types of tools, or for certain types of sensors.

One option that could be used in the tool described above is to use wireless sensors. For example, a wireless pressure sensor could be installed virtually anywhere on the tool, and its pressure readings could be transmitted to the system controller using a low-power radio circuit. Of course, the system controller would need a compatible radio receiver to accept those pressure reading messages. In addition, the tool itself would need to be physically designed to allow the radio waves to travel between the transmitter and receiver without being blocked by a metallic structural member, for example.

Various types of wireless sensors could be used in such a tool data acquisition system. For example, a wireless pressure sensor is already being used in millions of automobiles since the "Tire Pressure Monitoring System (TPMS)" was made mandatory for passenger vehicles in the United States. Those sensors communicate using a low-frequency radio to the vehicle's onboard computer system. The only significant disadvantage to the TPMS system is that, once the battery for a given pressure sensor loses its charge, the entire sensor must be replaced. However, in the data acquisition system for pneumatic tools disclosed herein, the entire tool computer system would typically be powered by a battery (e.g., battery 130), so if that battery loses its charge before the life of the tool has ended, then the tool would need to be serviced in any case, and the wireless sensor (or its battery power source) could also be replaced at the same time, if necessary. (It is likely that the wireless sensor battery would well outlast the tool's computer system battery 130.)

Another possible type of wireless sensor could be designed so that it creates its own electrical charge while it operates, potentially minimizing or eliminating the need for a battery at the site of that sensor. For example, if a "magnetic pickup" was used to detect a moving magnet, (in which the magnet could also be the "target" of that magnetic pickup—acting as a proximity sensor), then that moving magnet (via its magnetic field) could impart an electrical charge into the magnetic pickup and that charge could then be sent into a small low-voltage (and small physically-sized) capacitor to store that charge for counting operating cycles, and also to power the sensor's low-power radio transmitter when it is time to send a reporting signal to the tool's data acquisition system controller.

One advantage of such system is that it could eliminate the need for an electrical conductor (or a fiber optic cable) that travels between a non-wireless sensor and the system controller, which could eliminate a significant constraint if the sensor was to be placed in a position on the tool that is difficult to reach for servicing, or difficult to reach with such an electrical conductor (or optical cable) connected to the system controller. Regardless of the type(s) of sensor(s) being used on the tool, the tool's system controller itself would still contain a radio circuit, but that radio would be used to communicate with the outside world—i.e., the wireless external computer or network server that is supposed to receive the data being gathered by the tool's internal data acquisition system.

Note that, if a wireless sensor was to be placed external to the tool's housing, then some type of antenna (or other wave guide) that penetrates through the housing would be desirable, so that its sensor's radio output signal would easily reach the (wireless) system controller that was positioned inside the tool's housing. The antenna 129 could be designed to perform both that function and to perform its original function of transmitting the system controller's wireless signals to the (outside world) wireless external computer or network server 250.

It will be understood that the interior pressurized air storage chamber that contains some of the electronic components, such as the wireless system controller, can be positioned almost anywhere in the overall tool, without departing from the principles of the technology disclosed herein. Although the illustrated embodiment shows this interior chamber within the handle portion 24 of the tool, that interior chamber does not literally have to be located there.

However, if the tool is to be hand-held for ease of operator use, then of course, the overall size and weight of the tool will be an important factor, and including the electronic components within a fairly large interior chamber would usually make sense to the designers of the tool. Moreover, most if not all of such 'air tools' include an air hose fitting on the bottom of their handle, and then include a large interior pressurized air storage chamber within the main portion of that same handle. This is done for logical reasons, including 'balancing' the tool so that the human user can easily move the tool about and 'aim' the tool properly when it is time to drive a fastener—having a large handle is essentially providing a good place for the center of mass of the tool near where the user's hand is holding the tool (near the trigger, which is also on the handle).

Even if the 'major' electronic components are not positioned within an interior chamber that temporarily stores pressurized air (or some other gas), then there will still be electrical wiring or at least one antenna that needs to be run throughout a portion of the overall tool, and that wiring/antenna should be protected from moving pressurized air, if possible. A cover or some other structure that includes an air deflector will likely be desirable in such 'air tools' that include such electronic or electrical components. (It should be noted that, almost every internal volume inside an 'air tool' allows pressurized gas to flow therethrough, sometime during at least a portion of the operating cycle of the functioning tool.

Note that some of the embodiments illustrated herein do not have all of their components included on some of the figures herein, for purposes of clarity. To see examples of such outer housings and other components, especially for earlier designs, the reader is directed to other U.S. patents and applications owned by Senco. Similarly, information about "how" the electronic controller operates to control the functions of the tool is found in other U.S. patents and applications owned by Senco. Moreover, other aspects of the present tool technology may have been present in earlier fastener driving tools sold by the Assignee, Kyocera Senco Industrial Tools, Inc., including information disclosed in previous U.S. patents and published applications. Examples of such publications are patent numbers U.S. Pat. Nos. 6,431,425; 5,927,585; 5,918,788; 5,732,870; 4,986,164; 4,679,719; 8,011,547, 8,267,296, 8,267,297, 8,011,441, 8,387,718, 8,286,722, 8,230,941, and 8,763,874; also published U.S. patent application No. 2016/0288305 and published U.S. patent application, No. 2018/0178361. These documents are incorporated by reference herein, in their entirety.

It will be understood that the logical operations described in relation to the flow chart of FIG. 15 can be implemented using sequential logic (such as by using microprocessor technology), or using a logic state machine, or perhaps by discrete logic; it even could be implemented using parallel processors. One preferred embodiment may use a microprocessor or microcontroller (e.g., microprocessor 150) to execute software instructions that are stored in memory cells within an ASIC. In fact, an entire microprocessor (or microcontroller 150, for that matter), along with RAM and executable ROM, may be contained within a single ASIC, in one mode of the technology disclosed herein. Of course, other types of circuitry could be used to implement these logical operations depicted in the drawings without departing from the principles of the technology disclosed herein. In any event, some type of processing circuit will be provided, whether it is based on a microprocessor, a microcomputer, a microcontroller, a logic state machine, by using discrete logic elements to accomplish these tasks, or perhaps by a type of computation device not yet invented; moreover, some type of memory circuit will be provided, whether it is based on typical RAM chips, EEROM chips (including Flash memory), by using discrete logic elements to store data and other operating information (such as the acquired sensor data stored, for example, in memory circuit 152), or perhaps by a type of memory device not yet invented. In general, the memory circuit of a particular electronic product will contain instructions that are executable by the processing circuit of that same particular electronic product.

It will also be understood that the precise logical operations depicted in the flow chart of FIG. 15, and discussed above, could be somewhat modified to perform similar, although perhaps not exact, functions without departing from the principles of the technology disclosed herein. The exact nature of some of the decision steps and other commands in these flow charts are directed toward specific future models of fastener driving tools (those involving Senco nailers or screwdriving tools, for example) and certainly similar, but somewhat different, steps would be taken for use with other models or brands of fastener driving tools in many instances, with the overall inventive results being the same.

It will be further understood that any type of product described herein that has moving parts, or that performs functions (such as computers with processing circuits and memory circuits), should be considered a "machine," and not merely as some inanimate apparatus. Such "machine" devices should automatically include power tools, printers, electronic locks, and the like, as those example devices each have certain moving parts. Moreover, a computerized device that performs useful functions should also be considered a machine, and such terminology is often used to describe many such devices; for example, a solid-state telephone answering machine may have no moving parts, yet it is commonly called a "machine" because it performs well-known useful functions.

Additionally, it will be understood that a computing product that includes a display to show information to a human user, and that also includes a "user operated input circuit" so the human user is able to enter commands or data, can be provided with a single device that is known as a "touchscreen display." In other words, if a patent claim recites a "display" and a "user operated input circuit" as two separate elements, then a single touchscreen display, in actually, is exactly the same thing. It should be noted that a touchscreen display usually includes a virtual keypad, and therefore, a "user operated input circuit" typically comprises a virtual keypad, particularly on smart phones and on tablet computers. Moreover, in this situation, the word "virtual" means that it is not a hardware keypad; more specifically, "virtual" means that it is formed (i.e., "created") on the display screen because of software being executed by a processing circuit.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal" Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A pneumatic fastener driving tool, comprising:
   (a) a working cylinder portion, a handle portion, a magazine portion, a guide body portion, an exit end portion, and an external pressurized gas inlet;
   (b) an exterior housing that at least partially encloses said working cylinder portion;
   (c) said working cylinder portion includes:
      (i) a hollow cylinder with a movable piston therewithin, and an elongated driver that is in mechanical communication with said movable piston such that movements of the elongated driver are related to movements of the movable piston; and
      (ii) a sensor subassembly located on said pneumatic fastener driving tool;
   (d) said guide body portion including a driver track that contains movements of the elongated driver during operation of the pneumatic fastener driving tool;
   (e) said magazine portion including at least one fastener to be fed into the driver track of the guide body portion;
   (f) said elongated driver being sized and shaped to push the at least one fastener from said exit end portion of the pneumatic fastener driving tool;
   (g) at least one internal chamber in the handle portion for containing pressurized gas, said at least one internal chamber including an internal housing subassembly, said internal housing subassembly comprising:
      (i) a system controller that includes: a first processing circuit, a first memory circuit, a radio circuit, and an electrical power source;
      (ii) an internal housing within the at least one internal chamber that covers a portion of said system controller; and
      (iii) a gas flow deflector positioned along at least a portion of a surface of the internal housing;
   (h) an antenna that extends from said radio circuit through an opening in the exterior housing;
   (i) said sensor subassembly includes:
      (i) a sensor; and
      (ii) a sensor enclosure that mounts to said working cylinder portion; and
   (j) a signal pathway between said first processing circuit and said sensor, said signal pathway being used for sending sensor data from said sensor to said first processing circuit;
   wherein: if said pneumatic fastener driving tool contains pressurized gas, then said gas flow deflector deflects a portion of gas flow away from said first processing circuit.

2. The pneumatic fastener driving tool of claim 1, wherein: said antenna includes at least three portions:
   (i) a first portion that extends from said radio circuit to the opening in said exterior housing;
   (ii) a second portion where the antenna continues and extends through said opening in the exterior housing; and
   (iii) a third portion where the antenna continues and runs outside of said exterior housing.

3. The pneumatic fastener driving tool of claim 2, wherein: said third portion of said antenna that penetrates through said exterior housing is positioned at a protected area of the exterior housing.

4. The pneumatic fastener driving tool of claim 3, wherein: said protected area comprises a recess in said exterior housing.

5. The pneumatic fastener driving tool of claim 1, wherein: said signal pathway comprises at least one of:
   (a) an electrical conductor; and
   (b) an optical cable.

6. The pneumatic fastener driving tool of claim 1, wherein: said sensor subassembly comprises:
   (a) the sensor enclosure that is sized and shaped to mount to a portion of an exterior wall of said hollow cylinder;
   (b) a printed circuit board to which a second processing circuit, a second memory circuit, and an interface circuit are mounted; and
   (c) wherein said printed circuit board is mounted within an interior space of said sensor enclosure, and is protected by the sensor enclosure.

7. The pneumatic fastener driving tool of claim 1, wherein: at least a portion of said signal pathway and said antenna are protected by a covering, said portion being within said at least one internal chamber of the tool.

8. The pneumatic fastener driving tool of claim 1, further comprising:
   (a) a magnet mounted on said movable piston;
   (b) a reed switch mounted to said printed circuit board of said sensor subassembly; and
   (c) wherein said reed switch detects movements of said magnet to determine piston operating cycles of said tool.

9. The pneumatic fastener driving tool of claim 1, wherein:
   (a) said external pressurized gas inlet is used for connecting an external pressurized gas source to the tool; and
   (b) said external pressurized gas inlet is positioned at a base portion of said handle.

10. The pneumatic fastener driving tool of claim 1, wherein:
    (a) said antenna transmits wireless radio signals to an external radio receiver, and
    (b) said wireless radio signals may include at least one of: sensor data, and tool location data.

11. The pneumatic fastener driving tool of claim 1, further comprising:
    a seal that covers said antenna and said opening in the exterior housing, said seal being used to contain pressurized gas inside the tool when compressed gas is present in said tool.

12. The pneumatic fastener driving tool of claim 11, wherein: said signal pathway comprises an internal opening within said tool of sufficient size to allow said radio signals to pass therethrough between a first radio circuit and a second radio circuit.

13. The pneumatic fastener driving tool of claim 11, wherein:
    (a) said antenna transmits wireless radio signals to an external radio receiver, and
    (b) said signals may include at least one of: sensor data, and tool location data.

14. The pneumatic fastener driving tool of claim 11, further comprising: a network server that includes an external radio receiver.

15. The pneumatic fastener driving tool of claim 11, further comprising: a wireless portable computer that includes an external radio receiver.

16. The pneumatic fastener driving tool of claim 11, wherein: said sensor comprises at least one of:
    (a) a mechanical position sensor;
    (b) a proximity sensor;
    (c) a temperature sensor;
    (d) a pressure sensor;
    (e) a force sensor;
    (f) a velocity sensor;
    (g) a distance sensor;
    (h) a flow sensor; and
    (i) a geographic location sensor.

17. A pneumatic fastener driving tool, comprising:
    (a) a working cylinder portion, a handle portion, a magazine portion, a guide body portion, an exit end portion, and an external pressurized gas inlet;
    (b) an exterior housing that at least partially encloses said working cylinder portion;
    (c) said working cylinder portion includes:
        (i) a hollow cylinder with a movable piston therewithin, and an elongated driver that is in mechanical communication with said movable piston such that movements of the elongated driver are related to movements of the movable piston; and
        (ii) a sensor subassembly located on said working cylinder portion;
    (d) said guide body portion including a driver track that contains movements of the elongated driver during operation of the pneumatic fastener driving tool, said driver track having a first longitudinal axis;
    (e) said magazine portion including at least one fastener to be fed into the driver track of the guide body portion;
    (f) said elongated driver being sized and shaped to push the at least one fastener from said exit end portion of the pneumatic fastener driving tool;
    (g) said handle portion extends along a second longitudinal axis that is not parallel to the first longitudinal axis, said handle portion including:
        (i) an external air connector for receiving pressurized gas from an external pressurized gas source;
        (ii) an internal air chamber that is in fluidic communication with said external air connector, used for containing the pressurized gas;
    (h) said internal air chamber includes:
        (i) an interior first housing that extends substantially parallel to the second longitudinal axis through at least a portion of the internal air chamber;
        (ii) an antenna that extends through at least a portion of said internal air chamber;
    (i) said interior first housing includes:
        (i) a first housing cover that substantially surrounds a first interior space within the interior first housing, said first housing cover creating a solid wall that extends substantially parallel to the second longitudinal axis between a first edge and a second edge of the first housing cover;
        (ii) a bottom portion that is affixed to the first housing cover at said first edge, in which the bottom portion is at least partially open so as to allow pressurized gas to flow therethrough, in which the pressurized gas also will flow along the solid wall between the first edge and the second edge, and through the first interior space;
        (iii) a gas flow deflector that is attached to the first housing cover, said gas flow deflector being sized and shaped to divide the first interior space into a second interior space and a third interior space, wherein:
            (A) a major portion of the pressurized gas is directed by the gas flow deflector toward the second interior space, and through the handle portion;

(B) the major portion of the pressurized gas is directed by the gas flow deflector away from the third interior space; and (iv) a system controller that includes: a first processing circuit, a first memory circuit, a radio circuit, and an electrical power source, wherein: said system controller is positioned within the third interior space, and thus, the major portion of the pressurized gas does not impact the system controller, even though pressurized gas does exist in the third interior space.

18. The pneumatic fastener driving tool of claim 17, wherein:
(a) the antenna extends from said radio circuit through an opening in the exterior housing;
(b) the sensor subassembly includes:
(i) a sensor; and
(ii) a sensor enclosure that mounts to said working cylinder portion; and further comprising:
(c) a signal pathway between said first processing circuit and said sensor, said signal pathway being used for sending sensor data from said sensor to said first processing circuit.

19. The pneumatic fastener driving tool of claim 17, wherein: the gas flow deflector extends away from said first housing cover in a perpendicular direction.

20. A pneumatic fastener driving tool, comprising:
(a) a working cylinder portion, a handle portion, a magazine portion, a guide body portion, an exit end portion, and an external pressurized air inlet;
(b) said working cylinder portion includes a hollow cylinder with a movable piston therewithin, and an elongated driver that is in mechanical communication with said movable piston such that movements of the elongated driver are related to movements of the movable piston, in which the movements of the elongated driver are along a first longitudinal axis;
(c) said handle portion extends along a second longitudinal axis that is not parallel to the first longitudinal axis, said handle portion including:
(i) an external air connector for receiving pressurized air from an external pressurized air source;
(ii) an internal air chamber that is in fluidic communication with said external air connector, used for containing the pressurized air;
(d) said internal air chamber includes:
(i) an interior first housing that extends substantially parallel to the second longitudinal axis through at least a portion of the internal air chamber;
(ii) an antenna that extends through at least a portion of said internal air chamber;
(e) said interior first housing includes:
(i) a first housing cover that substantially surrounds a first interior space within the interior first housing;
(ii) a bottom portion that is affixed to the first housing cover proximal to said external air connector, in which the bottom portion is at least partially open so as to allow pressurized air to flow through the interior first housing, and through the first interior space;
(iii) a gas flow deflector that is attached to the first housing cover, said gas flow deflector being sized and shaped to divide the first interior space into a second interior space and a third interior space, wherein:
(A) a major portion of the pressurized air is directed by the gas flow deflector toward the second interior space, and through the handle portion;
(B) the major portion of the pressurized air is directed by the gas flow deflector away from the third interior space; and
(iv) a system controller that includes: a first processing circuit, a first memory circuit, a radio circuit, and an electrical power source, wherein: said system controller is positioned within the third interior space, and thus, the major portion of the pressurized air does not impact the system controller, even though pressurized air does flow through the third interior space.

21. The pneumatic fastener driving tool of claim 20, further comprising:
(a) an exterior housing that at least partially encloses said working cylinder portion;
(b) said working cylinder portion includes a sensor subassembly located on said working cylinder portion;
(c) said guide body portion including a driver track that contains movements of the elongated driver during operation of the pneumatic fastener driving tool;
(d) said magazine portion including at least one fastener to be fed into the driver track of the guide body portion; and
(e) said elongated driver being sized and shaped to push the at least one fastener from said exit end portion of the pneumatic fastener driving tool.

* * * * *